(12) United States Patent
Kakii et al.

(10) Patent No.: US 7,352,385 B2
(45) Date of Patent: Apr. 1, 2008

(54) VIDEO EDITING SYSTEM, VIDEO EDITING METHOD, RECORDING/REPRODUCING METHOD OF VISUAL INFORMATION, APPARATUS THEREFOR, AND COMMUNICATION SYSTEM

(75) Inventors: Toshiaki Kakii, Yokohama (JP); Youichi Hata, Yokohama (JP); Hisao Maki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 19 days.

(21) Appl. No.: 10/651,255

(22) Filed: Aug. 29, 2003

(65) Prior Publication Data
US 2004/0080611 A1 Apr. 29, 2004

Related U.S. Application Data

(63) Continuation-in-part of application No. 10/417,345, filed on Apr. 17, 2003, now abandoned.

(30) Foreign Application Priority Data

Apr. 19, 2002 (JP) .......................... P2002-118321
Apr. 2, 2003 (JP) .......................... P2003-099355

(51) Int. Cl.
*H04N 7/14* (2006.01)
(52) U.S. Cl. ................... 348/14.07; 348/14.16
(58) Field of Classification Search .. 348/14.01–14.16; 434/365, 350, 309; 704/254; 709/204
See application file for complete search history.

(56) References Cited

U.S. PATENT DOCUMENTS 5,710,591 A * 1/1998 Bruno et al. ............. 348/14.09

(Continued)

FOREIGN PATENT DOCUMENTS

JP 04-351188 12/1992

(Continued)

OTHER PUBLICATIONS

1967 Joint Meeting of Four Electric Institutes (No. 1998) Study of Pick-up Tube Position in Videophone, Sato et al. 2pgs.

(Continued)

*Primary Examiner*—Stella Woo
(74) *Attorney, Agent, or Firm*—McDermott Will & Emery LLP

(57) ABSTRACT

The invention relates to a video editing system and others enabling editing of training video data suitable for training of counselors and others engaged in counseling and others in a direct or indirect face-to-face state and to a recording/reproducing method of visual information and others enabling useful personal learning even in an environment without direct appearance of an instructor or the like in the fields in which instruction or learning using the visual information is effective. Particularly, the video editing system is provided with image pickup capabilities for picking up images of respective, first and second interlocutors facing each other, and first editing capabilities for editing video data in which at least the videos of the first and second interlocutors retrieved from the image pickup means are combined in a state in which display timings thereof are substantially synchronized with each other.

32 Claims, 19 Drawing Sheets

U.S. PATENT DOCUMENTS

| | | | |
|---|---|---|---|
| 6,005,604 A | 12/1999 | Kakii | |
| 6,137,526 A * | 10/2000 | Kakii | 348/14.16 |
| 6,230,172 B1 * | 5/2001 | Purnaveja et al. | 715/512 |
| 6,538,684 B1 * | 3/2003 | Sasaki | 348/14.08 |
| 6,646,673 B2 * | 11/2003 | Caviedes et al. | 348/14.07 |
| 6,674,459 B2 * | 1/2004 | Ben-Shachar et al. | 348/14.09 |
| 6,728,673 B2 * | 4/2004 | Furuyama et al. | 704/254 |

FOREIGN PATENT DOCUMENTS

| | | |
|---|---|---|
| JP | 09-219851 | 8/1997 |
| JP | 10290789 | 11/1998 |
| JP | 10327380 | 12/1998 |
| JP | 2001285780 | 10/2001 |
| JP | 2003179918 A * | 6/2003 |

OTHER PUBLICATIONS

Optronics (1999), Eye-Contact Imaging Technology, Makoto Kuriki, NTT Corp. pp. 134-139.

* cited by examiner

Fig.18A

| Timestamp | Image data |
|---|---|
| 00:××:01 | dataA |
| 00:××:02 | dataB |
| 00:××:03 | dataC |
| 00:××:04 | dataD |
| 00:××:05 | dataE |
| 00:××:06 | dataF |
| 00:××:07 | |

Fig.18B

| Display start | Display end | Comment data |
|---|---|---|
| 00:××:03 | 00:××:09 | commentA |
| 00:××:20 | 00:××:20 | commentB |
| 00:△△:15 | 00:△△:30 | commentC |
| 00:△△:50 | 00:△△:53 | commentD |
| 00:□□:08 | 00:□□:30 | commentE |
| | | |
| | | |

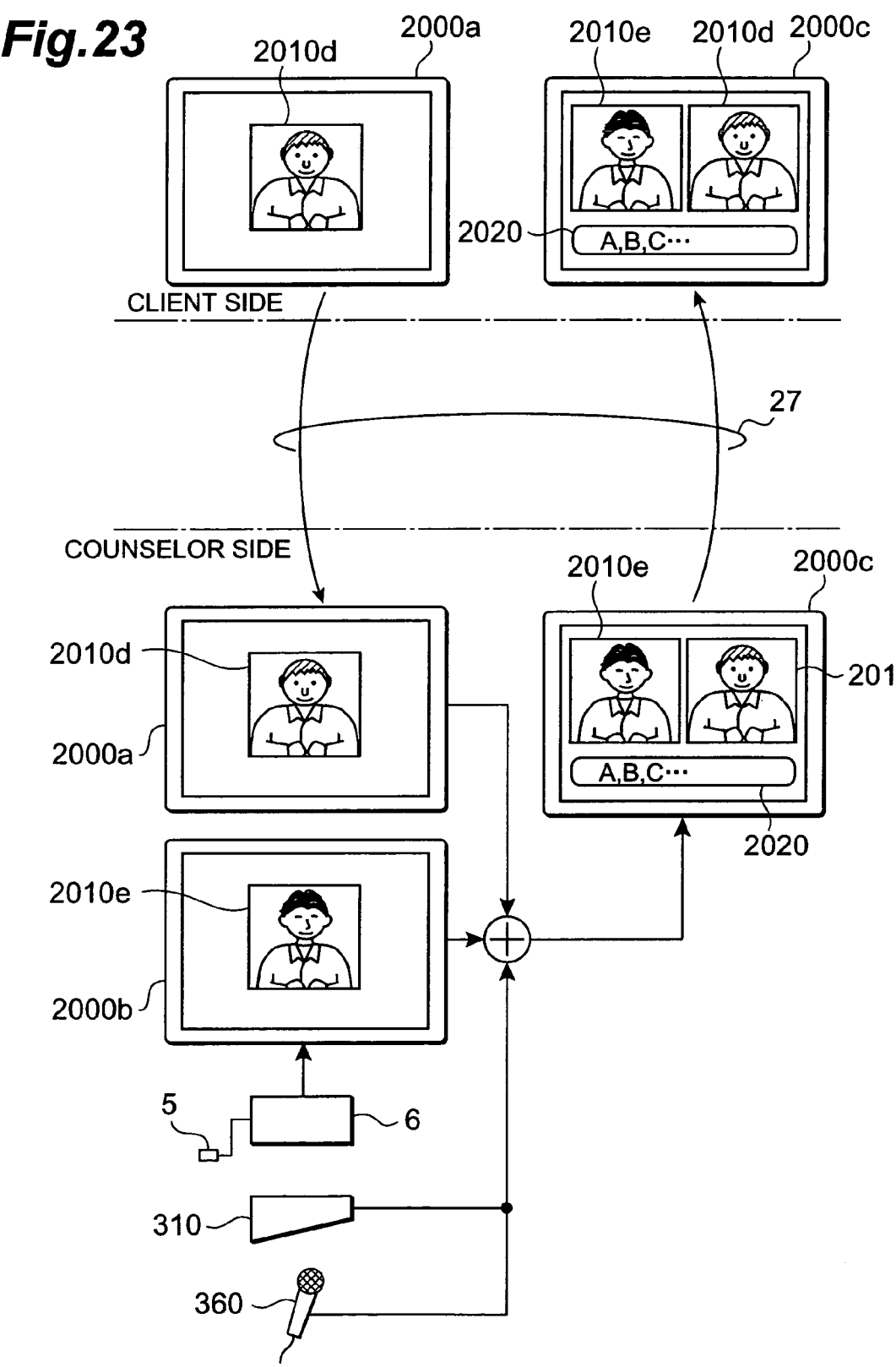

VIDEO EDITING SYSTEM, VIDEO EDITING METHOD, RECORDING/REPRODUCING METHOD OF VISUAL INFORMATION, APPARATUS THEREFOR, AND COMMUNICATION SYSTEM

This application is a continuation-in-part of the U.S. patent application Ser. No. 10/417,345, filed Apr. 17, 2003, now abandoned entitled VIDEO EDITING SYSTEM, VIDEO EDITING METHOD, RECORDING/REPRODUCING METHOD OF VISUAL INFORMATION, APPARATUS THEREFOR, AND COMMUNICATION SYSTEM, the disclosure of which is hereby incorporated in its entirety by reference.

BACKGROUND OF THE INVENTION

1. Field of the Invention

The present invention relates to a video editing system and others enabling editing of training video data suitable for training of counselors and teachers undertaking an important role in counseling and home learning of English conversation and the like based on the interlocutory form in a direct or indirect face-to-face state; and to a recording/reproducing method of visual information and others for, using as a search key comment information added at every display timing of visual information of a moving picture or the like, reproducing and displaying a desired portion of the visual information on a monitor screen.

2. Related Background Art

The need has been recognized in these years for improvement in teaching techniques in home learning, e.g., conversation in foreign languages such as English, Chinese, Japanese, etc. and for counseling on school refusal, unemployment, suicide, care for the elderly, and so on. On the other hand, the remarkable development of telecommunications technology has also come to permit one-to-one interlocution between remote places in these home learning and counseling through a network such as the Internet or the like.

It is the present status that the number of available teachers and counselors is not sufficient against increase of clients in the home learning and counseling, and there is an urgent need for increase in the number of counselors and others.

Meanwhile, e-learning with video and/or audio has also begun to actively be performed by making use of information processing devices such as personal computers and, particularly, utilization of visual information of video and others is directed toward applications in various fields including show business such as musicals and others, coaching in sports, self-learning, and so on. On the other hand, the development of communication infrastructure is also outstanding, and two-way interactive systems have also been constructed to implement distance interlocution while transmitting and receiving text data and/or video data between remote places through predetermined transmission means, regardless of either wire or wireless. For such distance interlocution, the two-way interactive systems enabling distance interlocution in an eye-contact state were proposed as systems for, instead of simply exchanging text data and partner interlocutor images, offering a closer interlocution environment in an indirect eye-contact state through the partner interlocutor images between interlocutors, for example, as described in U.S. Pat. No. 6,137,526 and No. 6,005,604.

SUMMARY OF THE INVENTION

The Inventor examined the above prior art and found the following problems. Namely, under the present set of circumstances, there is a limit to the number of senior counselors being supervisors for training teachers, primary counselors, etc., and many of these supervisors are localized in metropolitan areas. Such a present situation is a factor to make it difficult to construct systems for training teachers and primary counselors on a nationwide scale.

It is generally the case that in counseling or the like, primary counselors perform role plays (counseling simulations with one a counselor role and another a client role) and are supervised by a senior counselor as a supervisor (supervision), so as to improve their counseling skills. It is, however, the present status that there are a few supervisors who can directly participate in such role plays. It is also hard to secure places for the role plays.

Particularly, in the case of a role play in which a supervisor cannot directly participate, the supervisor will check a video of the role play at a later date. In that case, the supervisor has his or her limits to observation of expression or the like. There was also the problem that the supervisor was unable to provide finely detailed guidance on specific action or the like.

Namely, while the finely detailed guidance (supervision) given through the role plays by the supervisor is indispensable to improvement in the skills of the teachers and primary counselors, the specific guidance for the primary counselors by the supervisor is limited to the means of telephone, e-mail, etc. under the circumstances in which the supervisor cannot directly participate; it was, therefore, the case that the environment to achieve the adequate effect of supervision was not realized except in extremely restricted cases.

Furthermore, in the case where on-line or off-line guidance is conducted in the fields of show business, sports, various educations, etc. in a communication system or terminal equipment (information processing apparatus) typified by the aforementioned two-way interactive systems or the like, it is well known that visual information, regardless of either moving pictures or still pictures, is effective as supplementary information. Particularly, in the case of the guidance with various visual information as in the show business (musicals and others), sports, etc., a director or a coach advises performers, or the performers themselves check the visual information to improve their performance or gain hints on improvement in performance.

In the conventional guidance using the visual information, however, even if the director or coach gave the performers useful comments, they were effective only during the guidance and, when the performers themselves again checked the visual information at a later date, it was difficult for them to reconfirm the useful comment information having already been given by the director or coach, in a state in which it was synchronized with reproduction of the visual information.

The present invention has been accomplished in order to solve the problems as discussed above, and an object of the invention is to provide a video editing system of structure for realizing editing of training video data to enable finely detailed guidance for training of teachers and counselors such as counseling and home learning in the one-to-one interlocutory form even between remote places, a video editing method carried out therein, a computer program configured to execute the method, and a recording medium containing a record of the computer program, and to provide a recording/reproducing method of visual information applied in the fields where the guidance with visual information is effective like musicals, sports, etc. and in structure wherein timely correlation is made between the visual information and useful comment information given by an instructor or the like and effective personal learning can be implemented even under circumstances where direct guidance is unavailable from the instructor or the like, an apparatus for the method, a communication system incorporating the apparatus, a computer program configured to execute the recording/reproducing method of visual information, and a recording medium containing a record of the computer program.

The video editing system and video editing method according to the present invention have the structure for enabling editing of training video data suitable for training of counselors and teachers undertaking a significant role in counseling and home learning of conversation in foreign languages based on the interlocutory form in a direct or indirect face-to-face state.

Specifically, the video editing system comprises image pickup means for individually picking up videos of respective interlocutors such as a primary counselor and a client, a teacher and a student, etc. performing a role play; and first editing means for editing the video data picked up by the image pickup means and editing video data for enabling finely detailed supervision by a supervisor. The interlocutors imaged by the image pickup means are preferably arranged to face each other directly, or indirectly through predetermined transmission means, while being in an eye-contact state with each other, in order to permit the supervisor to check their expression. The foregoing first editing means edits video data in which at least the videos of the respective interlocutors each retrieved from the image pickup means are combined in a state in which display timings thereof are substantially synchronized with each other. Each of the videos of the respective interlocutors combined may be given voice data of each interlocutor substantially synchronized with the display timing, or may be given character data equivalent to the voice data. Particularly, the character data allows keyword search, and processing (e.g., deleting) of proper names such as personal names, company names, etc.; therefore, the character data is preferable in terms of protection of personal information of the interlocutors.

In the video editing system according to the present invention, the first editing means may be configured to combine one or more multimedia data personally entered by an interlocutor, with the edited video data in a state in which the multimedia data is substantially synchronized with the display timing of each video of the interlocutors. The video editing system according to the present invention may further comprise display means for displaying the video data edited by the first editing means, on a predetermined display unit, e.g., on a monitor TV or screen. The display means is utilized on occasions when each interlocutor checks the progress of his or her role play, or in an editing work in which multimedia data such as characters, audio, video, etc. is further combined with the video data obtained by the first editing means. This display means can also be one for displaying the video data obtained from the first editing means, as the progress of the role play, for the supervisor undertaking supervision.

Furthermore, the video editing system according to the present invention may comprise second editing means for enabling the supervisor to add guidance information of a message or the like to the video data obtained by the first editing means. In the case where a plurality of supervisors undertake supervision on the one-to-one role play, the second editing means can combine each of multimedia data (characters, audio, video, etc.) entered as guidance information by the respective supervisors, with the video data edited by the first editing means in a state in which the data is substantially synchronized with the display timing of each video of the interlocutors. On the other hand, in the case where a senior supervisor further undertakes supervision on the supervision by the supervisor, similarly as in the case of the supervision on the role play of the primary counselors, the second editing means may edit video data of nested structure by repeatedly combining multimedia data (characters, audio, video, etc.) entered by the senior supervisor, with the video data edited by the first editing means in a state in which the data is synchronized with the display timing of each video of the interlocutors.

The editing method for providing the training video data as described above may be substantiated in the form of a program to be executed by a computer or the like and, in this case, the program may be delivered through a wired or wireless network, or may be stored in a recording medium such as a DVD, a CD, a flash memory, or the like.

On the other hand, the recording/reproducing method of visual information according to the present invention comprises a storage step of managing visual information and comment information in correlation with each other in a database; a reading step of reading out a corresponding portion of the visual information linked to comment information selected, using the comment information as a search key; and a reproduction-display step of reproducing and displaying the corresponding portion thus read out, on a display unit such as a monitor or the like. In the storage step, the visual information that can be displayed in a window on the monitor screen is stored in a segmented state in a plurality of information sections in the database, and comment information individually linked to one or more information sections among the information sections is stored in the database. In the above reading step, link information added to the comment information is specified using as a search key comment information selected from the comment information stored in the database and a correlated information section included in the visual information is read out based on the specified link information. The above reproduction-display step is to reproduce and display the read information section on the monitor screen. The foregoing visual information includes moving picture information, still image information, graphic information, text information, etc., and the foregoing comment information includes at least either visual information such as characters, graphics, still images, non-verbal moving pictures, etc. or auditory information such as audio, music, sound effect, and so on. Particularly, for example, in the case of counseling between remote places, if motion of "a nod" and/or voice of the counselor viewing the visual information is linked as comment information to video mail (included in the visual information) to a client in a state in which it is synchronized with the visual information, the client counseled by the counselor can simultaneously check the reaction of the counselor with his or her own image taken for the counseling, whereby a closer relation can be established between the counselor and the client even at remote places.

In the case where the visual information is a moving picture comprised of a plurality of consecutive images corresponding to respective information sections and given respective timestamps, the recording/reproducing method of visual information according to the present invention is preferably configured to further comprise an editing step of correlating each of the comment information with one or more information sections forming the moving picture, using link information of a time range indicating a predetermined reproduction time zone of the moving picture. In the case where the visual information is one or more still images corresponding to respective information sections, the recording/reproducing method of visual information is preferably configured to further comprise an editing step of correlating each of the comment information with one or more still images displayed on the monitor screen. Particularly, in the case where the visual information is images consecutive at predetermined intervals out of those constituting a moving picture and is one or more still images corresponding to respective information sections, the editing step in the recording/reproducing method of visual information may be to adjust a time range indicating a predetermined reproduction time zone in the moving picture, and thereby select or adjust one or more still images to be displayed on the monitor screen.

Furthermore, in the recording/reproducing method of visual information according to the present invention, in the case where the visual information is a moving picture comprised of a plurality of consecutive images corresponding to the respective information sections and given respective timestamps, the reproduction-display step may be configured to continuously reproduce and display on the monitor screen, an image group given timestamps included in a reproduction time zone designated by link information of the comment information selected. In the case where the visual information is images consecutive at predetermined intervals out of those constituting a moving picture and is one or more still images corresponding to the respective information sections, the reproduction-display step may be configured to reproduce and display on the monitor screen, a still image specified by link information of the comment information selected and at least one of still images at reproduction times before and after that of the still image specified.

The recording/reproducing apparatus of visual information according to the present invention comprises a display unit corresponding to the aforementioned monitor; a database for storing the visual information and comment information; and a control unit for implementing the recording/reproducing method as described above (the recording/reproducing method of visual information according to the present invention). The display unit enables multi-window display of information sections forming the visual information. In the database, the visual information is stored in a sectioned state in a plurality of information sections, and the comment information is stored while being individually linked to one or more information sections out of the information sections. The control unit controls reproduction and display of data constituting a desired information section out of the visual information stored in the database.

Specifically, using as a search key comment information selected from the comment information stored in the database, the control unit specifies link information added to the selected comment information, reads out a correlated information section included in the visual information on the basis of the link information specified, and reproduces and displays the information section thus read out, on the display unit.

In the case where the visual information is a moving picture comprised of a plurality of consecutive images corresponding to respective information sections and given respective timestamps, the above control unit is configured to store the comment information in the database in a state in which each of the comment information is correlated with one or more information sections forming the moving picture, using link information of a time range indicating a predetermined reproduction time zone of the moving picture. In the case where the visual information is one or more still images corresponding to respective information sections, the control unit is configured to store the comment information in the database in a state in which each of the comment information is correlated with one or more still images displayed on the display unit. Particularly, in the case where the visual information is images consecutive at predetermined intervals out of those constituting a moving picture and is one or more still images corresponding to respective information sections, the control unit is configured to adjust a time range indicating a predetermined reproduction time zone in the moving picture, and thereby select or adjust one or more still images to be displayed on the display unit.

Furthermore, in the case where the visual information is a moving picture comprised of a plurality of consecutive images corresponding to the respective information sections and given respective timestamps, the control unit is configured to successively read out an image group given timestamps included in a reproduction time zone designated by link information of the comment information selected and control continuous window reproduction and display thereof on the display unit. In the case where the visual information is images consecutive at predetermined intervals out of those constituting a moving picture and is one or more still images corresponding to the respective information sections, the control unit may be configured to successively read out a still image specified by link information of the comment information selected and at least one of still images at reproduction times before and after that of the still image specified, and control window reproduction and display thereof on the display unit.

The recording/reproducing apparatus of visual information having the structure as described above can also be applied to one terminal apparatus in a communication system enabling transmission and reception of data among a plurality of terminal devices through predetermined transmission means. In this case, the image information, or the like, constituting a part of the visual information, may be delivered through the transmission means toward the terminal device in which an input work of comment is done. Adversely, the input work of comment information may be done at another terminal device to the terminal device in which the visual information is stored, through the transmission means. In particular, when the visual information includes a person image, it is preferable that the person image is an image picked up so as to achieve an eye-contact to an observer positioned in front of the monitor screen when the image is displayed in the monitor screen, in order to dress a sense of unity together with the observer watching the monitor screen.

The recording/reproducing method of visual information as described above may be substantiated in the form of a program to be executed by a computer or the like and, in this case, the program may be delivered through a wired or wireless network, or may be stored in a recording medium such as a CD, a DVD, a flash memory, or the like.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 18A and 18B are tables showing the logical structures of data stored in D/Bs shown in FIG. 17

FIG. 23 is an illustration for conceptually explaining a third example of the recording/reproducing method of visual information according to the present invention.

DETAILED DESCRIPTION OF THE PREFERRED EMBODIMENTS

Embodiments of the video editing system, the recording/reproducing method of visual information, and others according to the present invention will be described below in detail with reference to FIGS. 1, 2A, 2B, 3-17, 18A, 18B, 19, 20, 21A, 21B, 22, and 23. The same reference symbols will denote the same portions throughout the description of the drawings, without redundant description.

Video Editing System

The video editing system according to the present invention enables editing of training video data suitable for training of counselors and teachers undertaking a significant role in counseling and home learning such as English conversation based on the interlocutory form in a direct or indirect face-to-face state. Particularly, in the counseling or the like, the primary counselors can improve their counseling skills while undergoing guidance (supervision) by the supervisor (senior counselor) through role plays (counseling simulations with one as a counselor role and another as a client role). Such role plays are preferably conducted in an eye-contact state with each other both in the case where the counselor and client directly face each other and in the case where they face each other through a network between remote places. In the present specification, therefore, the first description will be given about the structure of a two-way interactive system enabling interlocution in an eye-contact state between remote places and a method of implementing eye contact by making use of the system. Such systems and methods of achieving eye contact are described in U.S. Pat. No. 6,137,526 and No. 6,005,604.

Figure 1:
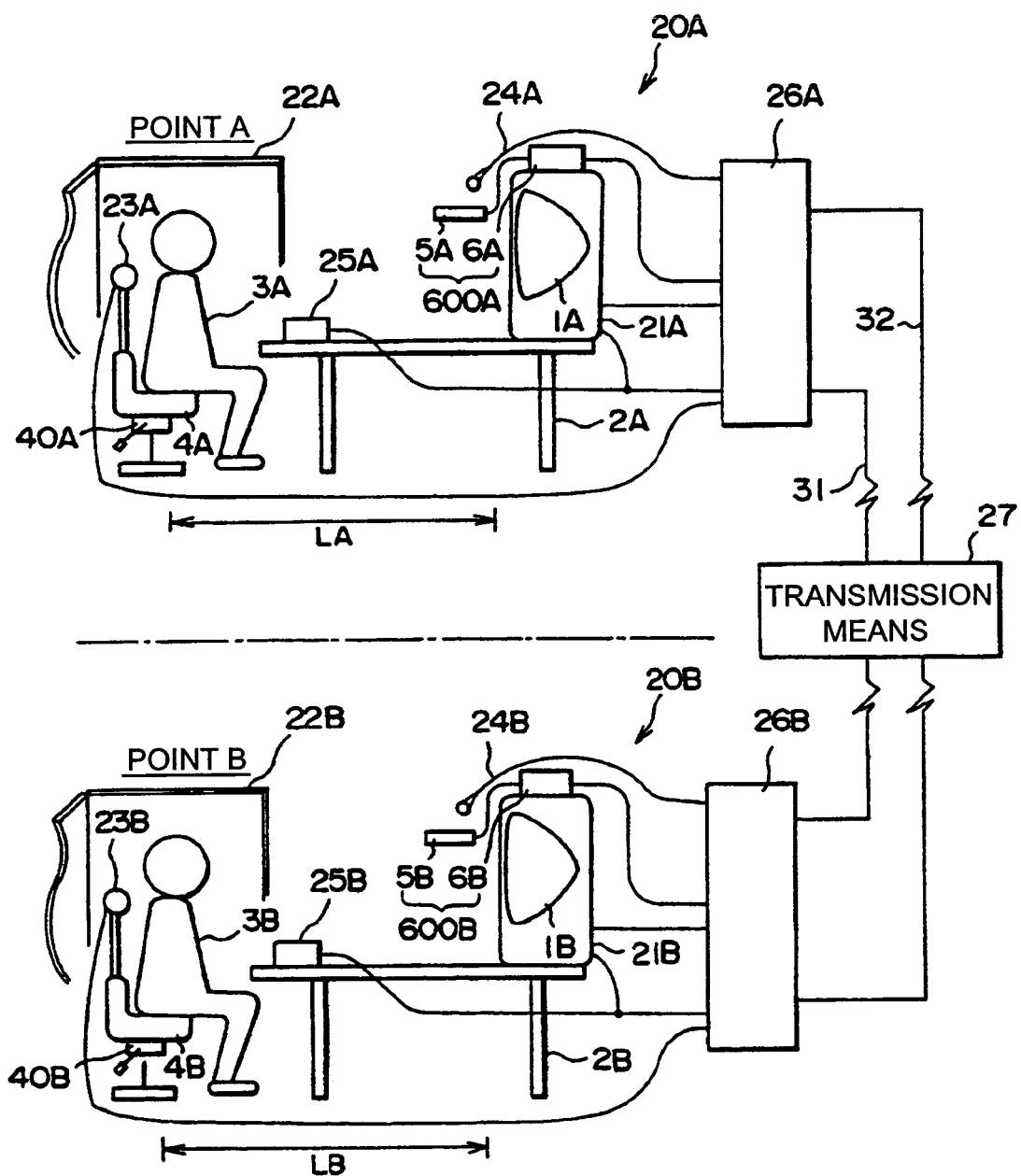
FIG. 1 is an illustration showing a configuration of a two-way interactive system for achieving eye contact through transmission means between remote places.

FIG. 1 is a logical configuration diagram showing the entire two-way interactive system enabling eye contact between interlocutors located at remote places. This system is a system for implementing two-way interaction between an interlocutor 3A (first interlocutor) at point A (first point) and an interlocutor 3B (second interlocutor) at point B (second point). Particularly, since this system is a counseling system for establishing close relationship of trust even between interlocutors at remote places to realize in-depth communication or a system intended toward home learning, at least one interlocutor is assumed to be a counselor such as a teacher, a doctor, a psychologist, or the like. Therefore, this system is provided with various functions and configurations for providing information necessary for counseling by those counselors and for providing an ideal counseling environment.

Specifically, at point A, there are (a) a chair 4A for the interlocutor 3A (e.g., a counselor) to sit on, (b) a table 2A at which the interlocutor 3A sits, and (c) a terminal device 20A with a mechanism for achieving eye contact between interlocutors through transmission means 27. On the other hand, at point B, there are (a) a chair 4B for the interlocutor 3B (e.g., a client undergoing counseling) to sit on, (b) a table 2B at which the interlocutor 3B sits, and (c) a terminal device 20B with a mechanism for achieving eye contact between interlocutors through transmission means 27. Here the transmission means 27 includes an optical fiber transmission line 31 (main transmission line), a satellite communication transmission line 32 (backup transmission line), etc. enabling large-volume transmission for implementing transmission and reception of image data and audio data between the terminal device 20A at point A and the terminal device 20B at point B. The transmission means 27 may be either wired or wireless means. The transmission means embraces networks such as telephone line networks already installed and also embraces electronic Bulletin Board Systems (BBS) with various databases.

At point A, the aforementioned chair 4A functions for determining the position of the interlocutor 3A. This chair 4A is preferably fixed in order to keep the distance constant between the interlocutor and display unit 21A of the terminal device 20A. However, even in the case where the chair 4A is not fixed, it is also possible to keep the distance constant between the chair 4A and the display unit 21A, by setting the table 2A between the interlocutor 3A and the display unit 21A (the fact was confirmed that the existence of table 2A established a psychological standard of distance for the interlocutor 3A). The same also applies to the configuration of the terminal device 20B at point B where the partner interlocutor 3B (e.g., a counselee or the like) is present.

At point A, the terminal device 20A is provided with (1) a display unit 21A with monitor TV 1A located on the table 2A, for displaying the video of interlocutor 3B and others on the basis of the image information transmitted through the transmission means 27 from the terminal device 20B at point B; (2) an imaging unit 6A for capturing the video of interlocutor 3A picked up by CCD camera 5A, as image information and transmitting the information to the terminal device 20B at point B; (3) an audio output unit 23A (speaker) for outputting the voice of interlocutor 3B on the basis of audio information transmitted through the transmission means 27 from the terminal device 20B at point B; and (4) an audio input unit 24A (microphone) for collecting the voice of interlocutor 3A as audio information and transmitting the information to the terminal device 20B at point B. Furthermore, in order to implement more in-depth communication as a counseling system, the system is also provided with (5) a character/graphics input unit 25A (an interface such as a keyboard, a pointing device, a touch panel, or the like) for letting the interlocutor 3A input characters and/or graphics and letting the display unit 21A display the input characters and/or graphics, and for transmitting the character/graphics information to the terminal device 20B at point B; and (6) an image processor 26A (first and second editing means) disposed between the above components and the transmission means 27 and configured to perform signal processing, transmission control, editing works of video data, and so on. The terminal device 20B at point B is also configured in structure similar to that of the terminal device 20A at point A described above.

Furthermore, the structure of the image pickup devices 600A, 600B (image pickup means) will be described below in the terminal devices 20A, 20B at point A and at point B. For convenience' sake of description, concerning the components common to the terminal devices 20A, 20B at point A and at point B, the letters A and B for discriminating the points from each other will be omitted, for example, like the image pickup device 600. Unless otherwise stated in particular, the terminal device 20A at point A will be described as a general rule, and redundant description will be omitted about the terminal device 20B at point B having the common configuration.

The image pickup device 600 is provided with a micromini CCD camera 5 (5A) being an image pickup unit, a support mechanism 10 (cf. FIGS. 2A and 2B) for locating the CCD camera 5 at a predetermined position in a supporting state, and an imaging unit 6 (6A) for controlling the CCD camera 5. The monitor TV 1 (1A) is mounted on the table 2 (2A) and the interlocutor 3 (3A) sits on the chair 4 (4A) with the height adjuster 40 (40A) placed a distance L (m) apart from the monitor TV 1. The distance L (LA) is set in the range of not less than 0.5 m nor more than 5 m. The cylindrical micromini CCD camera 5 with the outside diameter $\phi$ of not more than 20 mm and the length of approximately 100 mm is positioned between the interlocutor 3 to be imaged, and the monitor TV 1. The CCD camera 5 is set so that the direction of image pickup is directed to the interlocutor 3 to be imaged. Then the video of the interlocutor 3 picked up by the camera 5 is transmitted as image information from the imaging unit 6 to the other interlocutor side (i.e., transmitted through the transmission means 27 to the terminal device 20B at point B). A small deviation might occur in the distance between the display unit 21 and the interlocutor, depending upon the interlocutor. Therefore, in order to be adapted for such circumstances, the CCD camera 5 is preferably one selected from those with large depths of focus.

Figure 2:
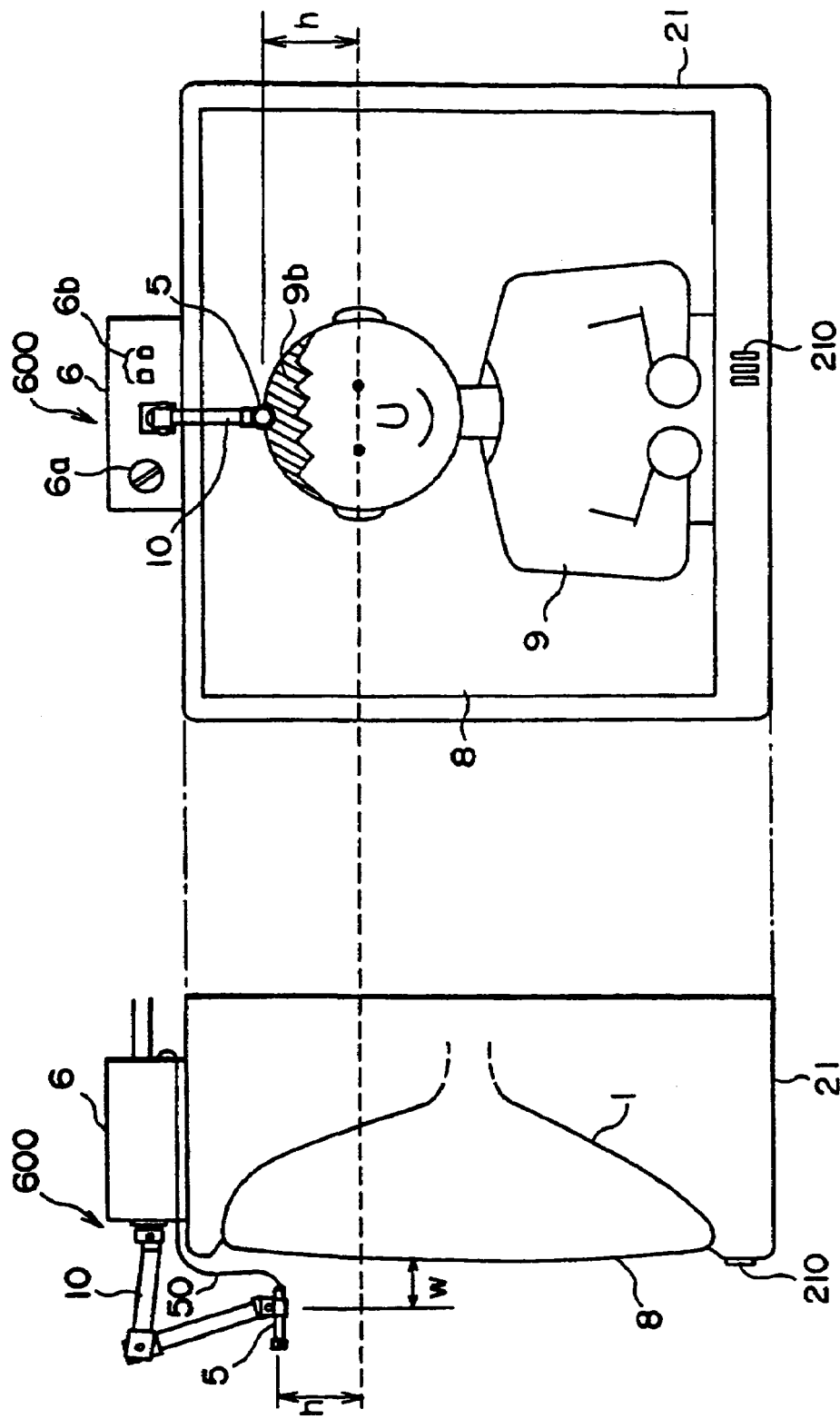
FIGS. 2A and 2B are views showing an image pickup device shown in FIG. 1 and views for explaining a method of setting a CCD camera for eye contact.

The specific location of the micromini CCD camera 5 will be described below with reference to FIGS. 2A and 2B.

First, the imaging unit 6 of the image pickup device 600 is placed on the display 21 for displaying the video of the other interlocutor transmitted thereto. The main body of this imaging unit 6 is provided with a changeover switch 6a for effecting changeover between display of the video of the interlocutor himself picked up by the camera 5 (the video being captured through camera cable 50 into the imaging unit 6) and display of the video of the other interlocutor 3B having been transmitted, and switches 6b for various adjustments. Switches 210 include a power switch for on/off of power of the monitor TV 1, and other switches. The CCD camera 5 is set at the predetermined position in front of monitor screen 8 displaying the image 9 of the other interlocutor 3B having been transmitted, by the support mechanism 10 (robot arm). The monitor screen 8 is a screen in the size from not less than 4 inches to about 40 inches.

Specifically, the CCD camera 5 is located at the position w (cm) ahead of the monitor screen 8 and in the vicinity of the head 9a of the interlocutor image 9 displayed on the monitor screen 8. The center axis of the cylindrical CCD camera 5 is located h (cm) above the position of the eyes of the interlocutor image 9 indicated by a dotted line.

Since the micromini CCD camera 5 is located in the vicinity of the head and above the position of the eyes of the interlocutor image 9 displayed on the screen 8 of the large-scale monitor TV 1 as described above, it will cause no particular trouble in two-way interlocution. For example, in the case of a system configuration in which the CCD camera 5 is located h=about 10 (cm) above the position of the eyes of the interlocutor image 9 (the position indicated by the dotted line in the figures) displayed on the screen 8 and in which the distance L is about 2.5 (m) between the monitor TV 1 and the interlocutor 3, the parallax angle is 2.3°, which can be adequately lower than the detection limit, or parallax angle 3° (even if the space w between the monitor screen 8 and the CCD camera 5 is about 10 (cm), there occurs no particular influence on variation of parallax angle). Namely, it was confirmed that, as long as the interlocutor could clearly see the partner's eyes (the eyes in the image of the other interlocutor 3B displayed on the monitor screen 8) in the eye-contact state, the existence of the micromini camera 5 around the head thereof caused little trouble in two-way interlocution if the screen 8 of the monitor TV 1 was large enough. It was also confirmed by experiment that the size of the screen 8 enough to implement good two-way interlocution was the size of about 35 cm horizontal and 26 cm or more vertical. There was also obtained the result that psychological trouble tended to decrease even in the small size of the screen if the interlocutors were acquaintances to each other. Therefore, the screen size can be determined according to applications.

Figure 3:
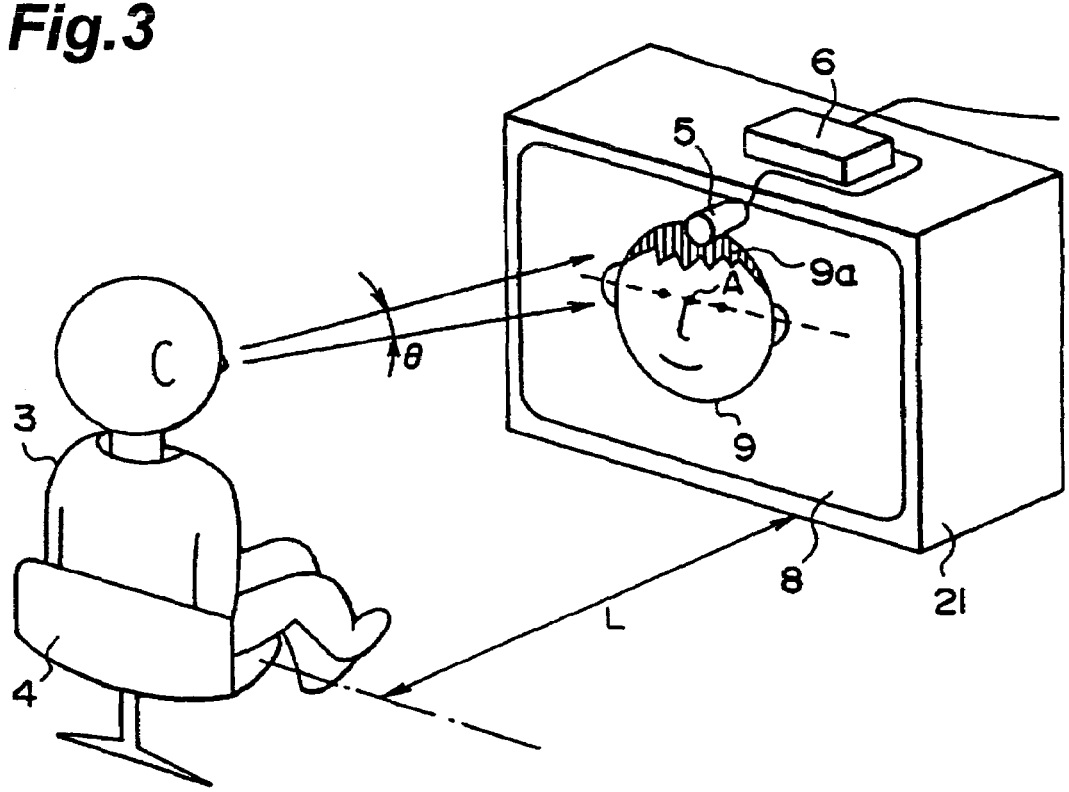
FIG. 3 is an illustration for explaining the parallax angle.
Figure 4:
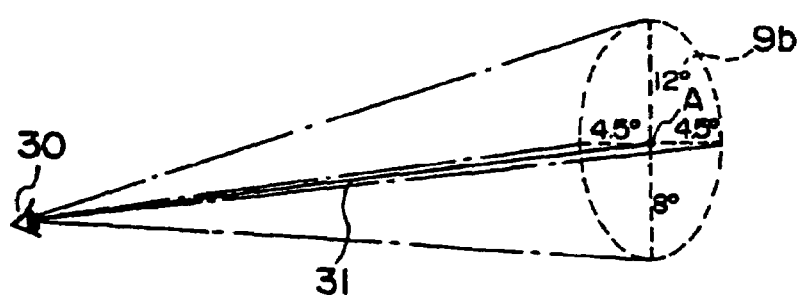
FIG. 4 is a view showing a region in which the CCD camera should be set.

Furthermore, the parallax angle will be described with reference to FIG. 3. In the present specification, the parallax angle refers to an angle θ between the visual axis of the interlocutor 3 to be imaged, which is directed toward the interlocutor image 9 displayed on the monitor screen 8, and the visual axis of the interlocutor 3 directed toward the CCD camera 5, as shown in FIG. 3. In other words, the parallax angle represents a deviation angle of the installation location of the CCD camera 5 from the visual axis of the interlocutor 3. The eye contact stated herein means that the deviation angle falls within the tolerance to unnaturalness due to the setting location of the CCD camera 5, as reported in 1967 Joint Meeting of Four Electric Institutes (No. 1998). Quantitatively, the eye contact is defined within the eye contact range in which the parallax angle is not more than 4.5° horizontal (on each of the both temple sides of the image 9 with respect to the center A between the eyes of the interlocutor image 9), not more than 12° in the immediately above direction (on the head 9b side of the image 9 with respect to the image center A), and not more than 8° in the immediately below direction (on the body side of the image 9 with respect to the image center A). It is a matter of course that the parallax angle is preferably as small as possible, and it is reported that the detection limit is not more than 3° horizontal and vertical. Accordingly, the area in which the CCD camera 5 can be set is a conical region shown in FIG. 4. This conical region is defined by an eye-contact zone 9b on the monitor screen 8 at the predetermined distance L (m), with respect to the visual axis 31 of the interlocutor 3 connecting the eye 30 of the interlocutor 3 to the center point A of the interlocutor image 9 displayed on the monitor screen 8 (in the present embodiment, the center between the both eyes of the interlocutor image 9 is defined as the center point A of the interlocutor image 9), and by the position of the eyes 30 of the interlocutor 3.

The video editing system according to the present invention combines the videos of the first interlocutor 3A and the second interlocutor 3B in the mutual eye-contact state achieved by the mechanisms as described above, to provide the video data edited for supervision.

Figure 5:
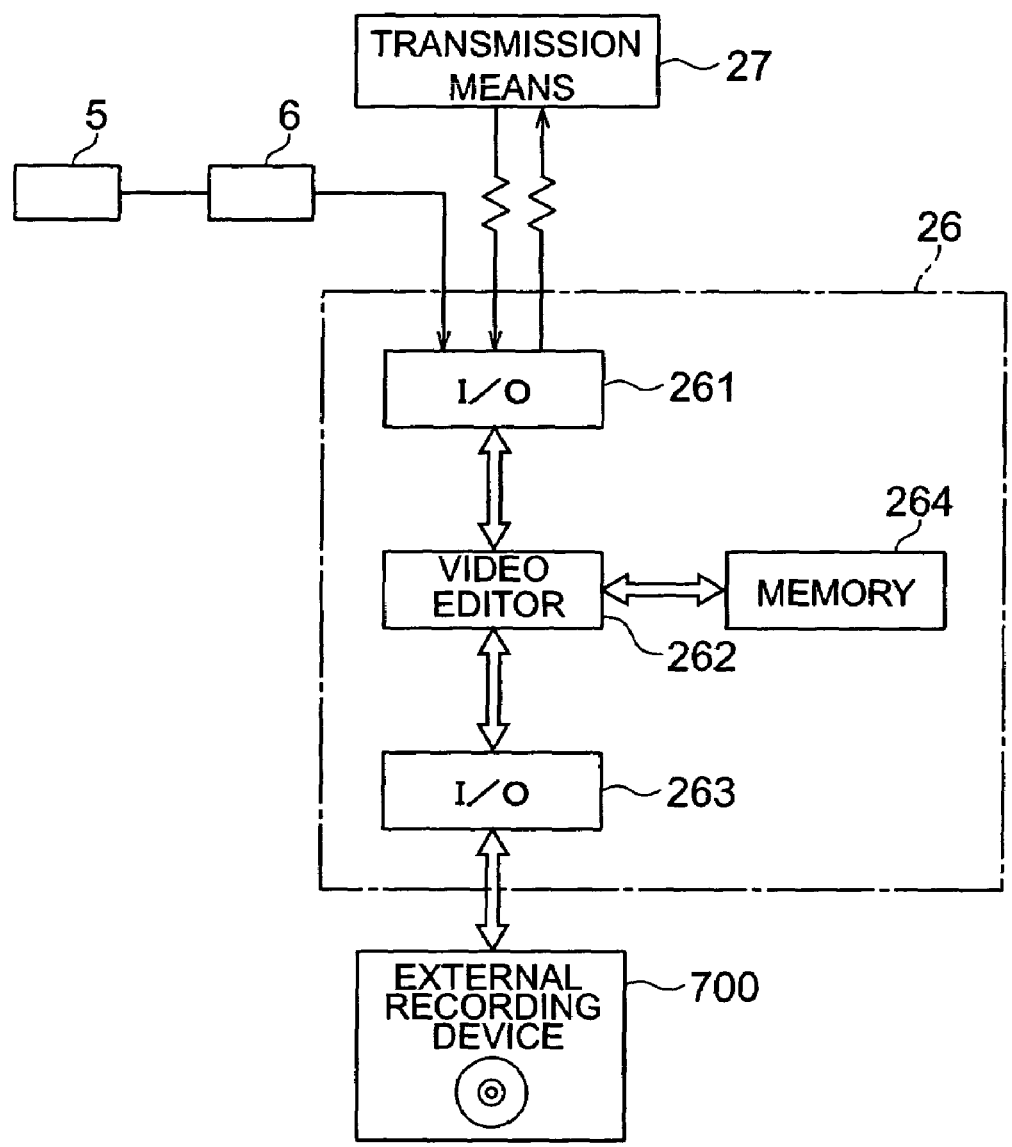
FIG. 5 is a diagram showing a schematic configuration of an image processing device (including the first editing means in the video editing system according to the present invention).

FIG. 5 is a schematic configuration of image processor 26 including the first editing means in the video editing system according to the present invention. The image processor 26 (26A, 26B) is provided with at least a data input/output unit 261 (I/O in the figure) for capturing image information from the imaging unit 6 in the image pickup means and for implementing transmission and reception of image information of the partner interlocutor through the transmission means 27; a video editor 262 as the first editing means for editing the video data for supervisor; a memory 264 used in the editing works of video data; and a data input/output unit 263 (I/O in the figure) for outputting the video data edited by the video editor 262, to an external recording device 700, for example, such as a magnetic tape, a CD, an optical disk, a hard disk, a DVD, a flash memory, or the like.

In the image processor 26 (which can be one of the terminal devices 20A, 20B of the first and second interlocutors), when the video of the first interlocutor 3A is captured through I/O 261, the video editor (CPU) 262 first puts the video of the first interlocutor 3A thus captured, into a work area of the memory 264, and delivers the video of the first interlocutor 3A from I/O 261 through the transmission means 27 to the partner terminal device 20B. When the video of the second interlocutor 3B is transmitted from the partner terminal device 20B through the transmission means 27, I/O 261 captures the video and the video editor 262 puts the video of the second interlocutor 3B into the work area of the memory 264 in a state in which its display start timing is matched with that of the video of the first interlocutor 3A already stored (in a state in which their display timings are synchronized with each other), and edits the video data for supervision.

When the role play (for about ten to twenty minutes) is finished eventually, the video data obtained (including the videos of the first and second interlocutors 3A, 3B whose display timings are synchronized with each other) is put through I/O 263 into the external recording device 700 such as a CD, a hard disk, a DVD, or the like.

In the case where the supervisor undertakes supervision in real time through the transmission means from a remote place, the terminal device on the supervisor side can be one of the configuration as shown in FIG. 1 and the image processor 26 (particularly, the video editor 262) in the supervisor-side terminal device functions as the second editing means. In the configuration wherein the videos of the first and second interlocutors are transmitted from the respective terminal devices on the first and second interlocutor sides through the transmission means 27, the image processor 26 in the supervisor-side terminal device can function as the aforementioned first and second editing means. On the other hand, in the case of off-line supervision, the supervisor can use an information processing device with the data transmitting function and data processing function, including the image processor 26 shown in FIG. 5, for example, like a personal computer or the like.

Figure 6:
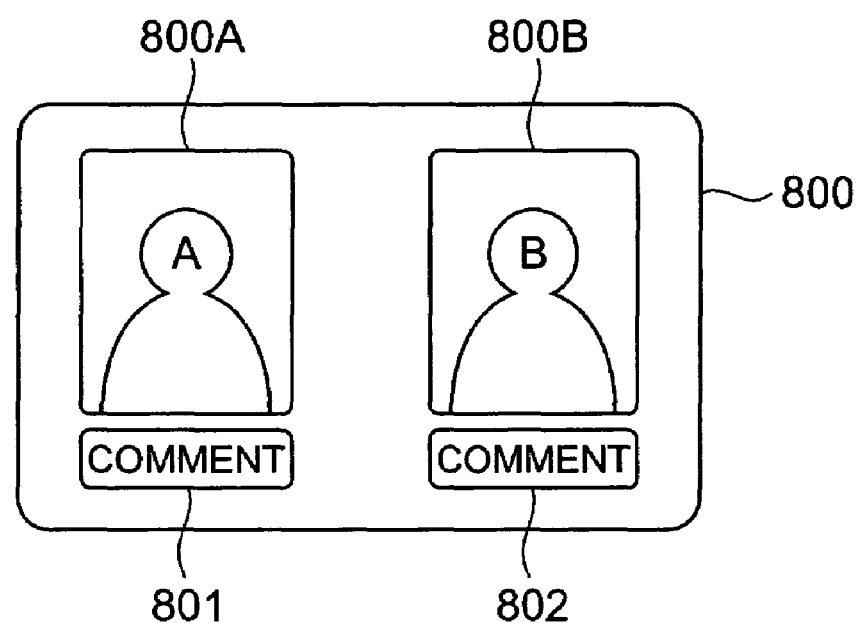
FIG. 6 is a diagram showing an example of the display screen (video data edited by the first editing means) displayed by the display means in the video editing system according to the present invention.

FIG. 6 is a diagram showing an example of the display screen based on the video data edited in the foregoing image processor 26. In this display screen 800, the video 800A of the first interlocutor 3A (A in the figure) and the video 800B of the second interlocutor 3B (B in the figure) are displayed in a state in which the display timings thereof are substantially synchronized with each other. In the example shown in FIG. 6, the videos 800A, 800B of the respective, first and second interlocutors 3A, 3B are combined with each other, and thereafter comments (handwritten characters, audio, data entered through a keyboard, or character data resulting from conversion from voice to characters) 801, 802 personally made by the first and second interlocutors 3A, 3B are added and edited in a state in which their display timing is substantially synchronized with the display timing of the videos. The synchronization of the display timing of each comment 801, 802 with that of each video of the interlocutors is implemented by the interlocutor's personally entering a comment in a video-stop state when the interlocutor desires to add the comment. Furthermore, each of the videos 800A, 800B of the first and second interlocutors 3A, 3B thus combined may be given audio data of each interlocutor in the role play in a synchronized state, or may be given character data equivalent to the audio data. Particularly, the character data is preferable in terms of protection of the personal information of the interlocutors, because it permits the keyword search and processing of the proper names such as personal names, company names, etc. (e.g., elimination thereof).

Figure 7:
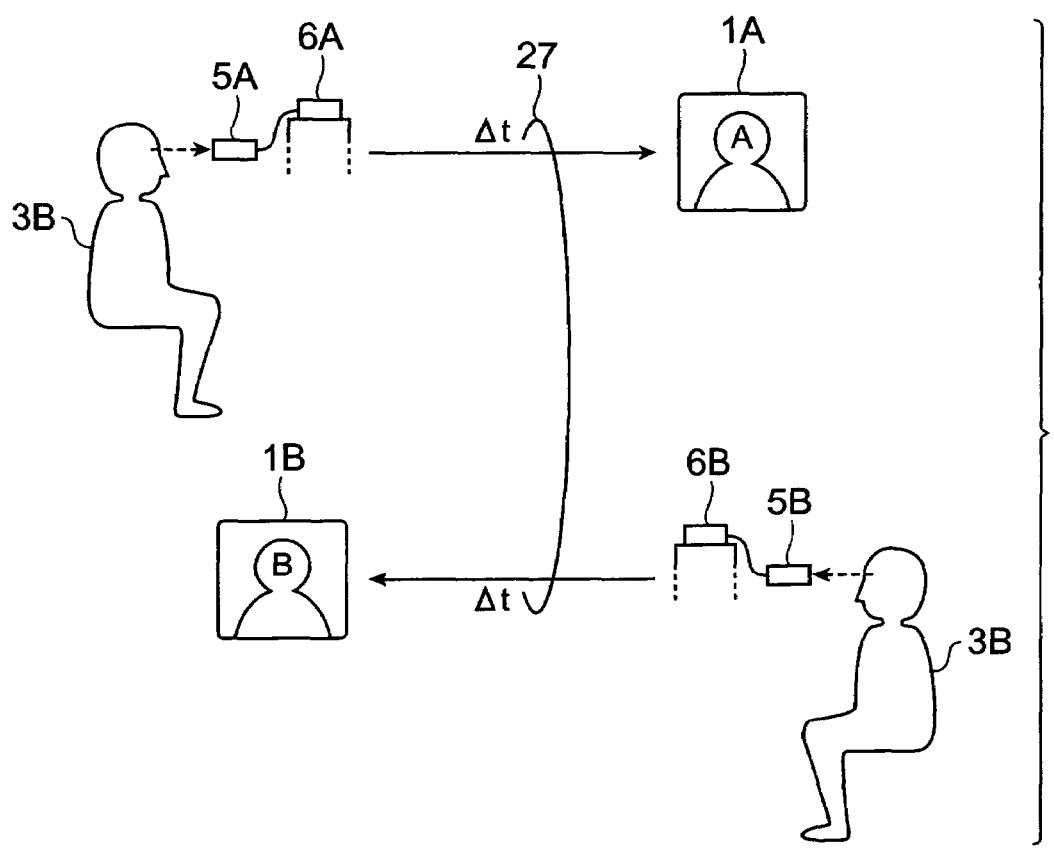
FIG. 7 is a conceptual diagram for explaining deviation of video display timing between remote places.
Figure 8:
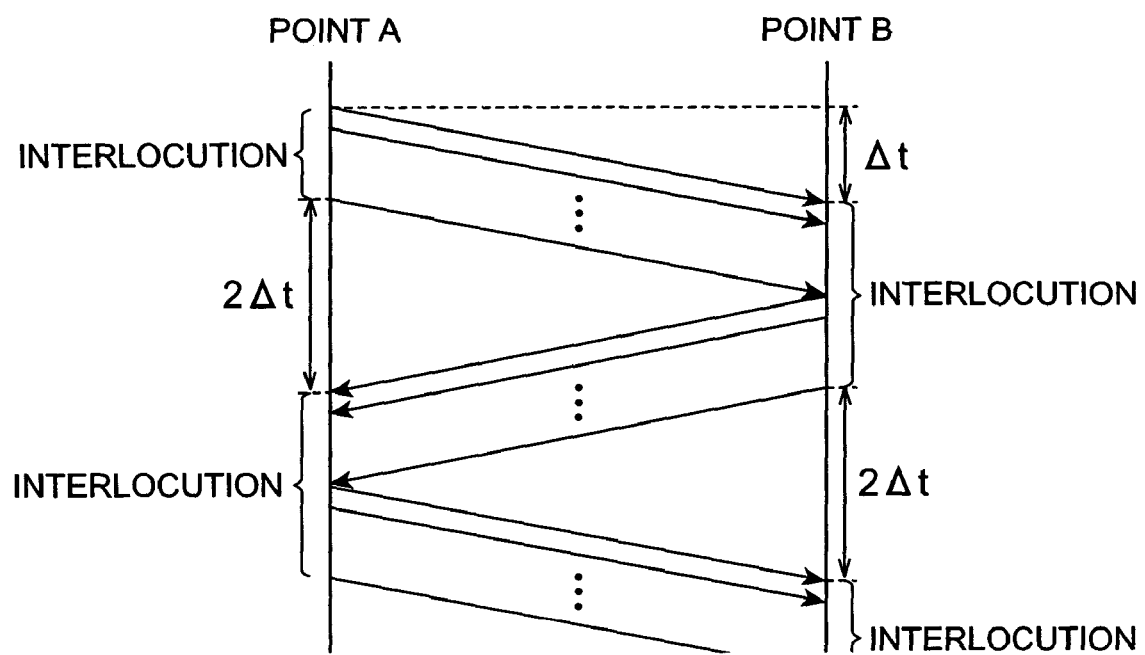
FIG. 8 is a time chart for explaining deviation of video display timing between remote places.

In the video data edited by the video editor 262 in the image processor 26, as described above, the video of the first interlocutor 3A and the video of the second interlocutor 3B are combined in the state in which the display timings thereof are substantially synchronized with each other, but, in the case of practical role-playing between remote places, as shown in FIG. 7, the image 1A (or 1B) of the partner interlocutor presented to each interlocutor is displayed with a delay of Δt behind the practical interlocutor action. If the delay time Δt is approximately several hundred ms (e.g., 400 ms or less; preferably, 200 ms or less), the supervisor will not feel unnatural on the view of the combined video data even in a state in which the display timings thereof are synchronized by matching start points of the role-playing. However, for example, if the delay time Δt is several seconds, as shown in FIG. 8, each interlocutor will not be allowed to take any action during the period from a point of completion of origination of his or her information to a start of reception of information from the partner interlocutor (for the time of 2Δt) and thus the supervisor will also feel odd. Therefore, when the delay time Δt is large enough to be perceived as described, the system can be configured so that the image information (the video of the interlocutor) is provided with timestamps at predetermined timings on the one interlocutor side and transmitted to the other interlocutor side and so that the other interlocutor side transmits to the one interlocutor side the image information of the other interlocutor (the video of the partner interlocutor) provided with synchronized signals matching the timestamps, which makes it feasible to implement editing of the video data indicating the progress of the role-playing without a feeling of strangeness.

In this case, in the image processor 26 (which can be one of the first and second interlocutor side terminal devices 20A, 20B in the case of off-line supervision), when the video of the first interlocutor 3A (provided with timestamps at predetermined timings) is captured through I/O 261, the video editor (CPU) 262 first puts the video of the first interlocutor 3A thus captured, into the work area of the memory 264 and delivers the video of the first interlocutor 3A from I/O 261 through the transmission means 27 to the partner terminal device 20B. When the video of the second interlocutor 3B (provided with timestamps at positions corresponding to the timestamps included in the video of the first interlocutor 3A) is transmitted from the partner terminal device 20B through the transmission means 27, the I/O 261 captures the video, and the video editor 262 puts the video of the second interlocutor 3B into the work area of the memory 264 in a state in which the display start timings of the respective videos are synchronized so as to match the timestamps in the video of the second interlocutor 3B with those of the video of the first interlocutor 3A already stored, and edits the video data for supervision.

After the role play (of about ten to twenty minutes) is finished eventually, the video data obtained (including the videos of the first and second interlocutors 3A, 3B in the synchronized state of the display timings thereof with each other) is stored through I/O 263 into the external recording device 700 such as a CD, a hard disk, a DVD, or the like. The foregoing image processor 26 can be set in the supervisor-side terminal device in the case of on-line supervision.

Figure 9:
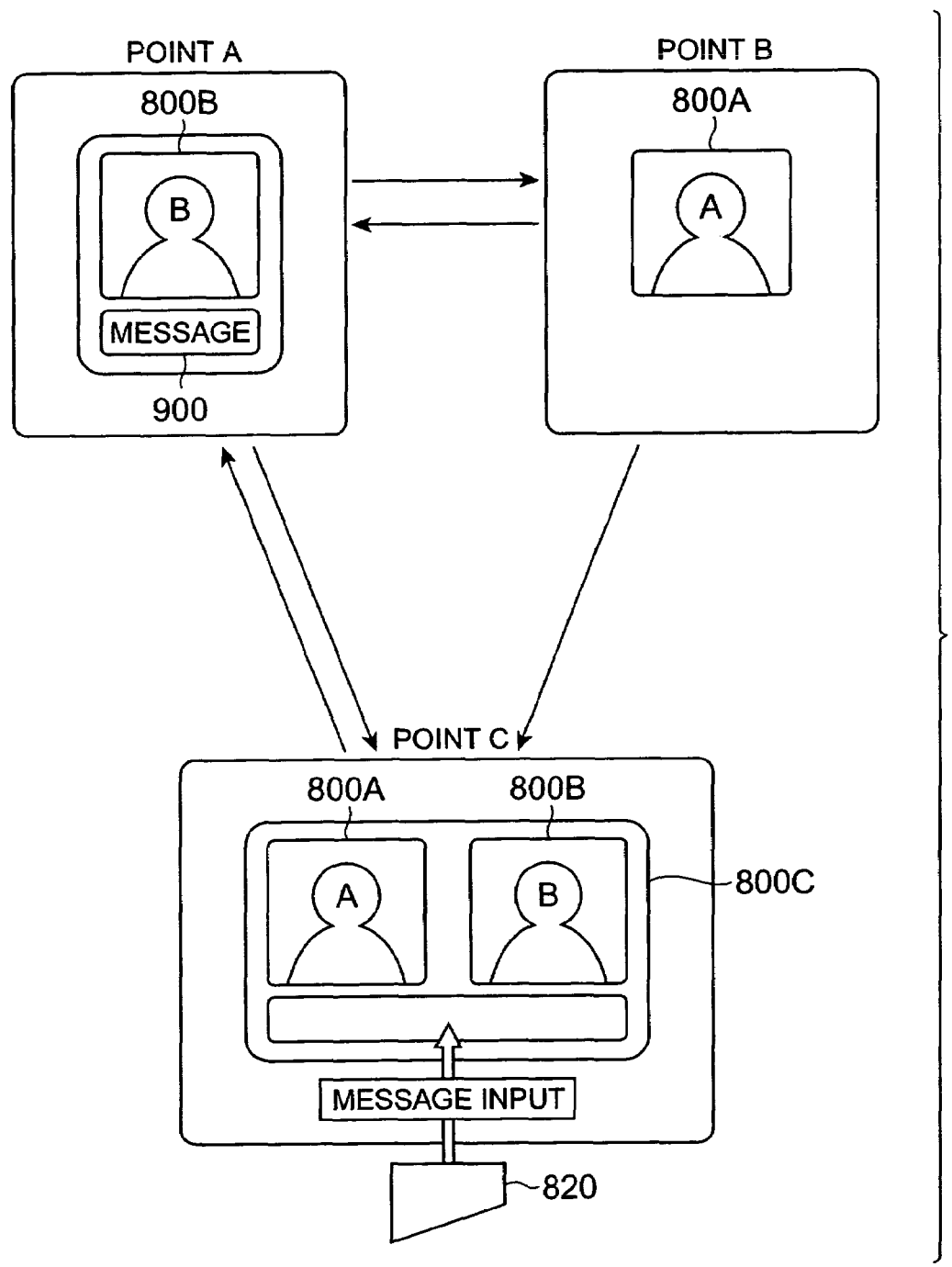
FIG. 9 is a conceptual diagram for explaining a state of supervision through transmission means.

There are a variety of examples of supervision on one-to-one role plays. For example, FIG. 9 shows an example in which the supervisor C at point C can supervise a role play between the interlocutor at point A (the video 800A displayed on the monitor of the terminal at point B) and the interlocutor at point B (the video 800B displayed on the monitor of the terminal at point A). In this case, the supervisor-side terminal device at point C has the structure as shown in FIG. 1, and the video editor 262 (cf. FIG. 5) in the image processor 26 of the terminal device functions as the first editing means for receiving the videos 800A, 800B of the respective interlocutors and combining these videos 800A, 800B and also functions as the second editing means for further combining a comment of audio, characters, etc. of the supervisor C with the video data of the videos 800A, 800B thus combined.

For example, in the case of real-time supervision through the transmission means 27, as shown in FIG. 9, the supervisor at point C enters a guidance message 900 (multimedia data such as characters, audio, video, or the like) including a comment to the interlocutor of the counselor role through the input means 820 (during this input work, the videos 800A, 800B are stopped to achieve synchronization between each video 800A, 800B and the input comment). In this configuration, the video editor 262 of the image processor 26 (cf. FIGS. 1 and 5) in the supervisor-side terminal device functions as the first editing means for combining the videos 800A, 800B of the respective interlocutors and as the second editing means for further combining the multimedia data from the supervisor with the video data edited by the first editing means.

Figure 10:
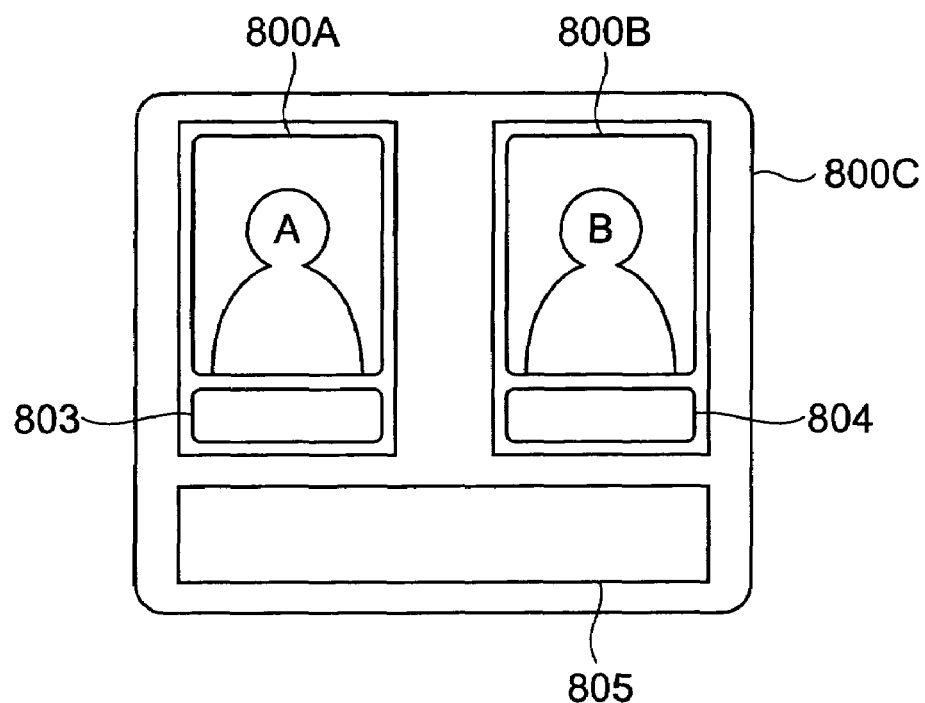
FIG. 10 is a diagram showing an example of the display screen presented to the supervisor at point C shown in FIG. 9.

FIG. 10 shows an example of the screen 800C (video data) displayed for the supervisor at point C, in which character information items 803, 804 equivalent to the voices of the respective interlocutors are displayed along with the synchronously displayed videos 800A, 800B of the first and second interlocutors 3A, 3B facing each other through the transmission means 27. The screen 800C displayed for the supervisor is also provided with a message area 805 for displaying a message from the supervisor.

Figure 11:
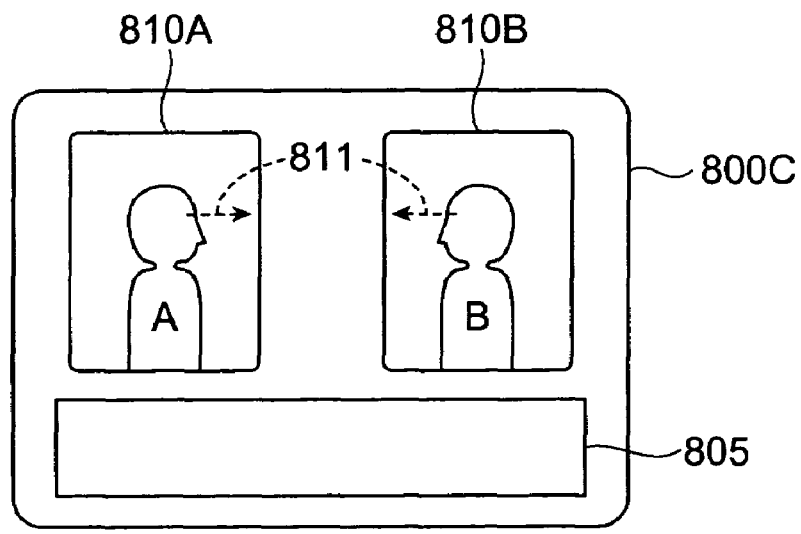
FIG. 11 is a diagram showing another example of the display screen presented to the supervisor at point C shown in FIG. 9.
Figure 12:
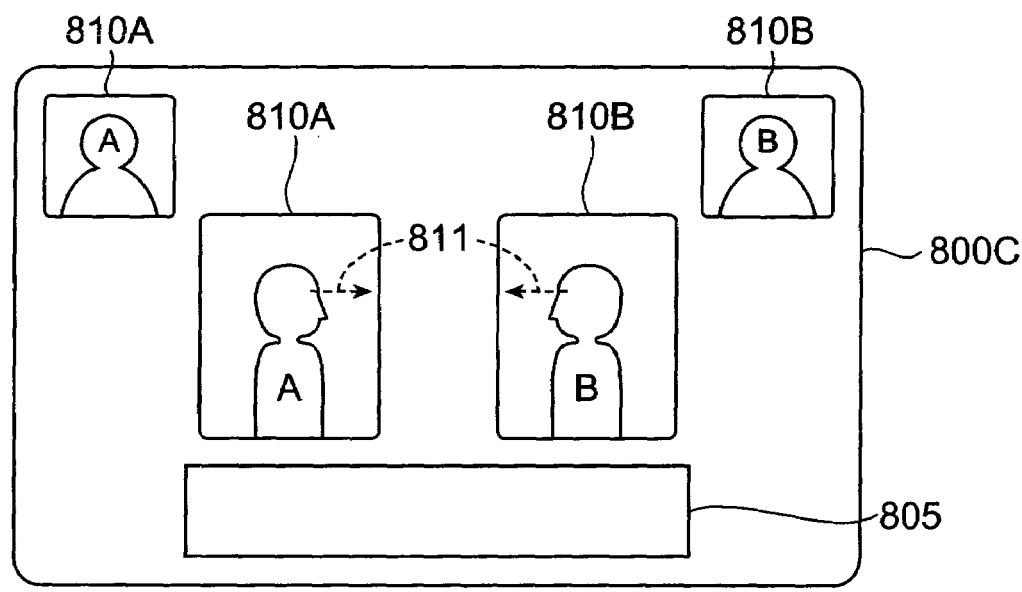
FIG. 12 is a diagram showing still another example of the display screen presented to the supervisor at point C shown in FIG. 9.

In the display image 800C of FIG. 10, the full-faced interlocutor images 800A, 800B (the videos of the partner interlocutors in the eye-contact state displayed for the respective interlocutors) are combined; however, since the supervisor personally does not directly participate in the one-to-one role play, the video data may be displayed on the screen for the supervisor, as shown in FIG. 11, in a state in which half-faced interlocutor images 810A, 810B of the respective interlocutors in the role play (in this case, the interlocutor images are picked up by other CCD cameras set separately from the CCD cameras for picking up the interlocutor images from the front) are combined with each other with their visual axes 811 matching each other. Furthermore, as shown in FIG. 12, the videos 800A, 800B picked up from the front of each interlocutor may also be displayed together with the interlocutor images 810A, 810B from the side in the eye-contact state with their respective visual axes 811 matching. The supervisor can keep track of the progress of the role play well in either case.

Figure 13:
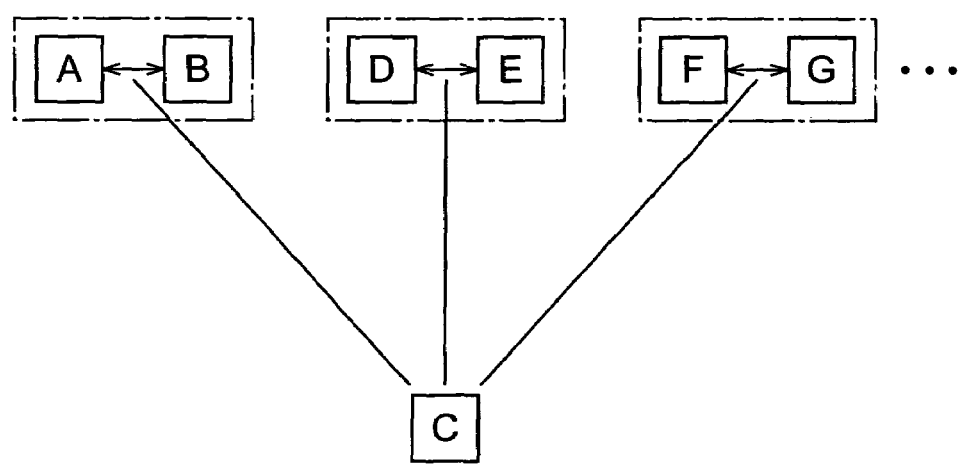
FIG. 13 is a diagram showing a first application example of supervision carried out in real time through the transmission means.

As examples of supervision there are a variety of conceivable examples including the off-line supervision (cf. FIGS. 1 and 5) and on-line supervision (cf. FIG. 9). For example, in the case of off-line supervision, the video data edited by the image processor 26 of FIG. 5 may be delivered through the transmission means to the supervisor; or, for security protection, the predetermined recording device (medium) such as a DVD, a CD, a flash memory, or the like may be mailed to the supervisor. Furthermore, as shown in FIG. 13, one supervisor C may supervise role plays conducted at respective places (role play between A and B, role play between D and E, and role play between F and G) through the transmission means 27. In this case, pairs of interlocutor videos in the respective role plays are displayed on the screen presented for the supervisor C, and the supervisor can optionally select a pair of interlocutor videos of interlocutors to be supervised, from these role plays and make the pair displayed in an enlarged scale, whereby the supervisor can simultaneously supervise the role plays of the plural pairs.

Figure 14:
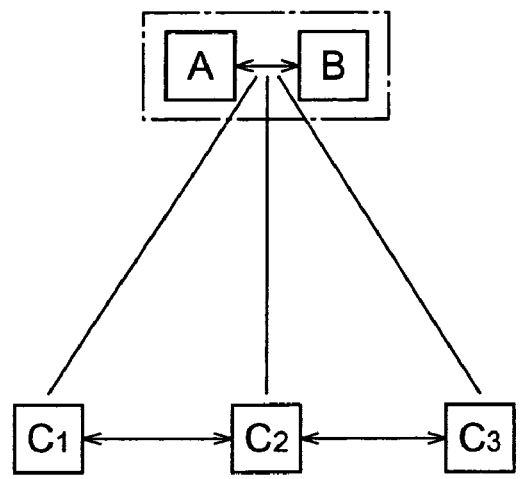
FIG. 14 is a diagram showing a second application example of supervision carried out in real time through the transmission means.

On the other hand, another example of supervision is one as shown in FIG. 14, in which a plurality of supervisors C1, C2, C3 can simultaneously supervise a pair of interlocutors in a role play through the transmission means 27. In this case, C1 to C3 all do not always have to be supervisors and, for example, it can be contemplated that one of them is a senior supervisor and the others are supervisor trainees or supervision spectators (observers). The supervisors C1, C2, C3 are provided display of the screen of video data in which messages or the like 807a-807c entered by the respective supervisors C1, C2, C3 are combined, as shown FIG. 16.

Figure 15:
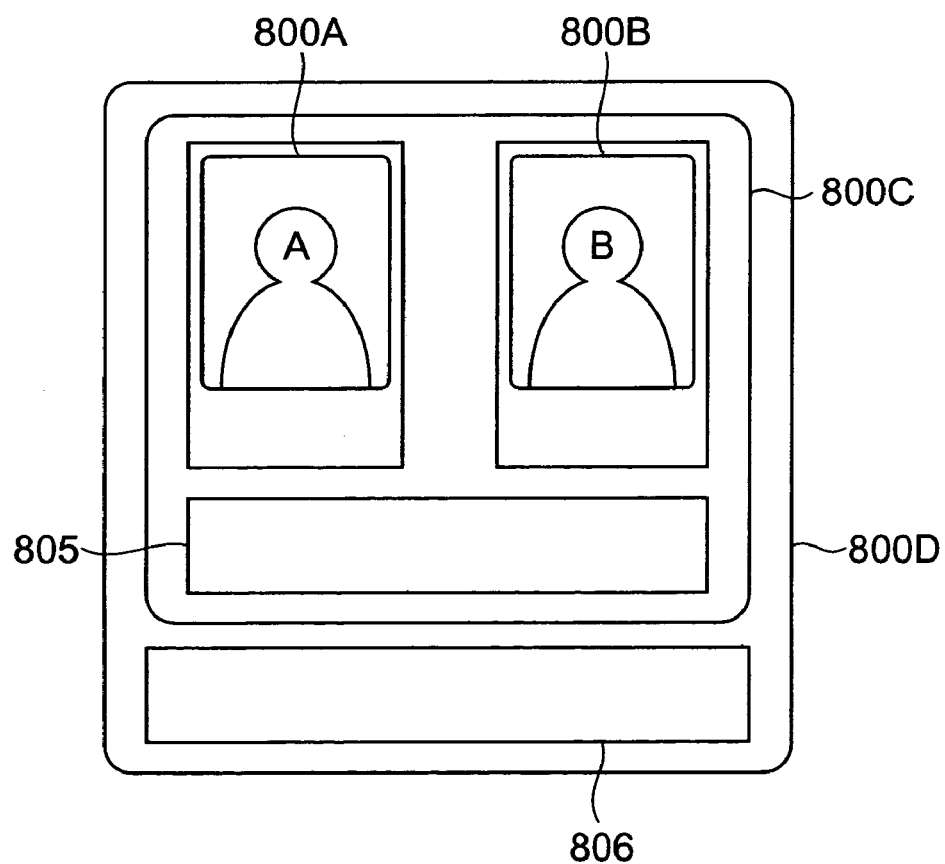
FIG. 15 is a diagram showing an example of the display screen of the video data edited by the second editing means in the video editing system according to the present invention, which is the display screen of video data finally obtained as a result of the supervision shown in FIG. 14.
Figure 16:
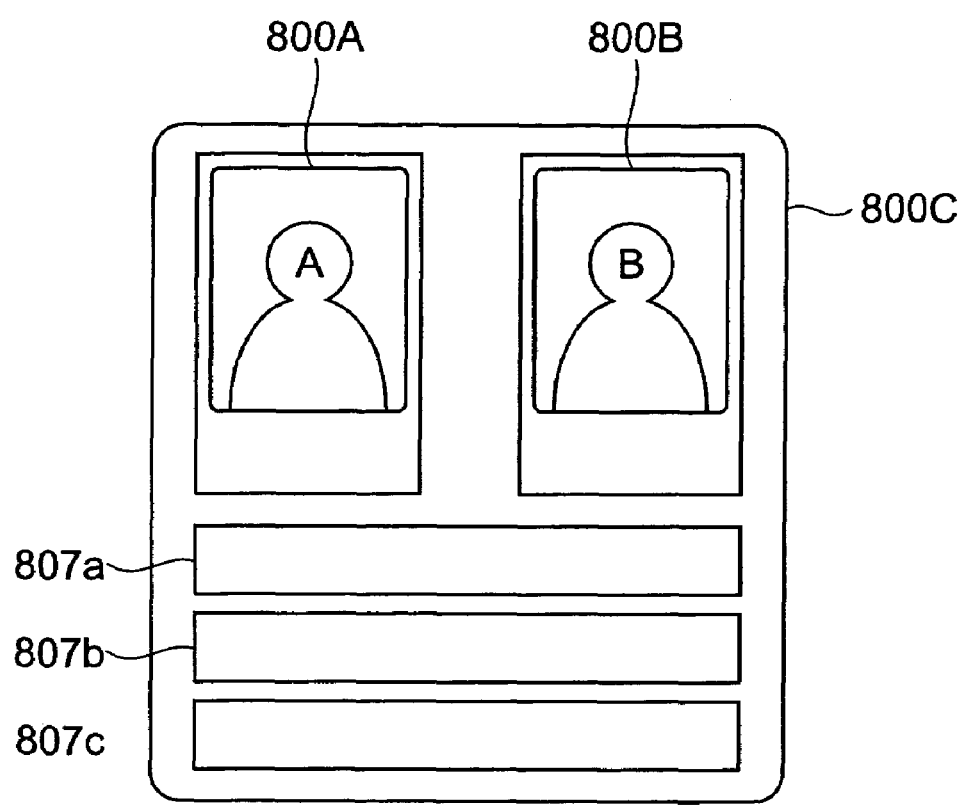
FIG. 16 is a diagram showing another example of the display screen of the video data edited by the second editing means in the video editing system according to the present invention, which is the display screen of video data finally obtained as a result of the supervision shown in FIG. 14.

Furthermore, the video editing system also enables editing of video data for supervision by a senior supervisor over supervision by a supervisor, as in the case of the supervision on the role play between primary counselors. In this case, a comment or the like 806 by the senior supervisor is further repeatedly combined with the display screen 800C of the video data of the interlocutor videos 800A, 800B combined (including the area 805 in which multimedia data of characters, audio, video, or the like entered by the supervisor can be displayed), whereby the video data can be edited in the nested structure displayed as shown in FIG. 15.

The video editing system and method according to the present invention can not be applied only to the training of counselors, but can also be applied to practical counseling; for example, the resultant video data can be applied to a wide variety of applications, including (1) looking-back (review) by the counselor, (2) looking-back by the client himself or herself on the view of the synthetic image edited, (3) information for team counseling or for reference, further (4) setting the comment information into a condition where the counselor can use it by the input of the client's impression directed to the psychological learning video while linking the video contents, as comment information such as characters or voice, and so on.

The means for achieving the eye contact as described in the present specification is just an example and the eye contact can also be achieved by adopting any other eye-contact method, for example, a method using a CCD buried in a monitor or a method of using a half-silvered mirror, as described in U.S. Pat. No. 6,005,604 and in OPTRONICS (1999), No. 3, pp.134-139.

Furthermore, if a list of messages combined on the resultant video data is generated as an index and if these messages are hyperlinked with corresponding videos, they can be used as very convenient data in confirmation, meeting, and so on.

As described above, the video editing system and others according to the present invention are configured to edit the video data in which the videos of the role-playing interlocutors in the eye-contact state with each other are combined in the state in which their display timings are substantially synchronized. This permits the interlocutors to undergo finely detailed guidance from the supervisor, regardless of either off-line or on-line. Since the information from the supervisor can be added to this video data, it becomes feasible to implement editing of training video data suitable for training of counselors and teachers undertaking the important role in counseling and home learning such as English conversation based on the interlocutory form in the direct or indirect face-to-face state.

Recording/Reproducing Method of Visual Information

Embodiments of the recording/reproducing method of visual information and others according to the present invention will be described below in detail with reference to FIGS. 17, 18A, 18B, 19, 20, 21A, 21B, 22, and 23.

Figure 17:
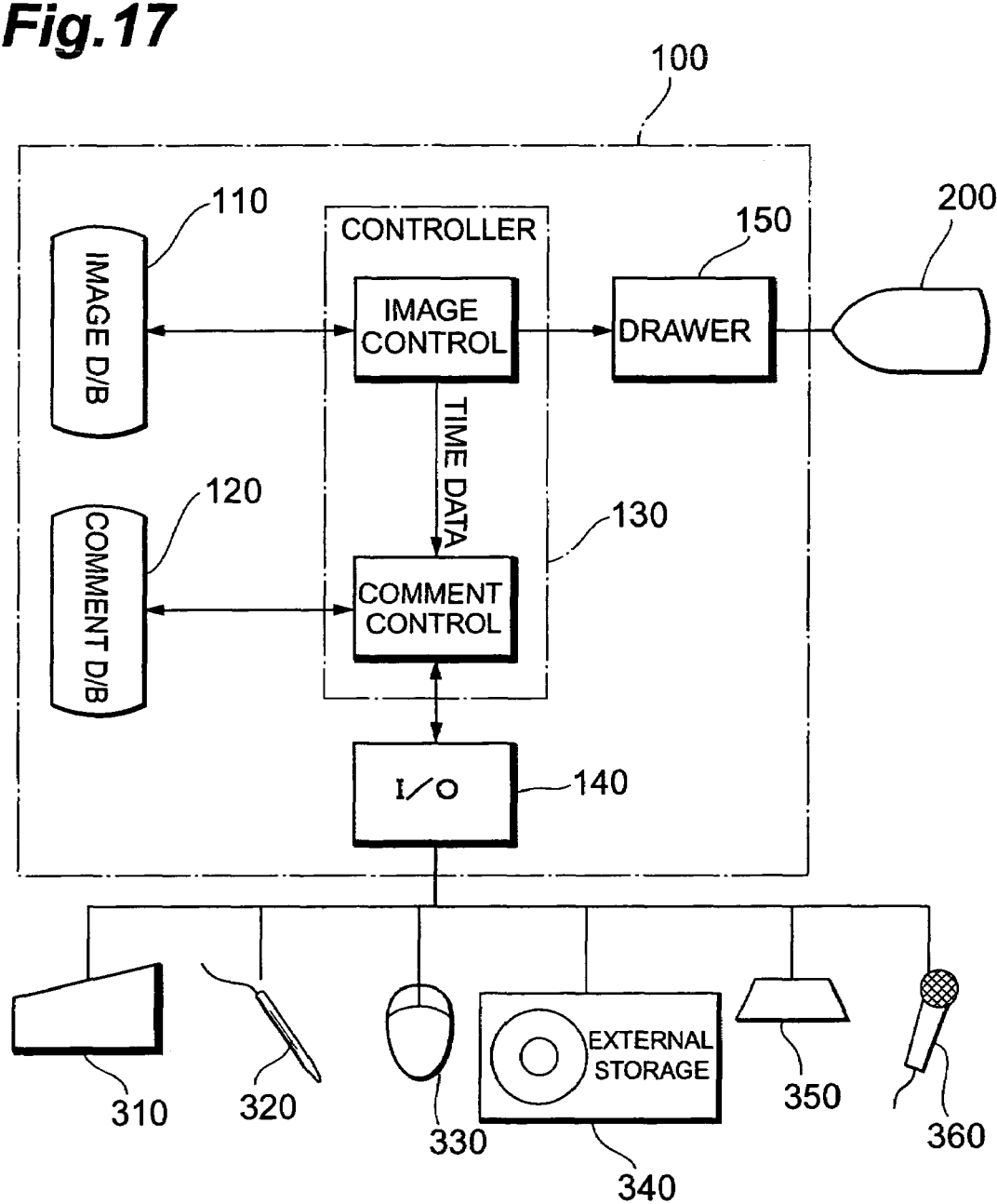
FIG. 17 is an illustration showing a schematic configuration of the recording/reproducing apparatus of visual information according to the present invention.

FIG. 17 is a diagram showing a schematic configuration of an apparatus for implementing the recording/reproducing method of visual information according to the present invention (a recording/reproducing apparatus of visual information according to the present invention). In FIG. 17, the recording/reproducing apparatus is provided with an information processor 100, a multiwindow-displayable display unit 200, a keyboard 310, an input pen 320, a pointing device 330 such as a mouse, an external recording device 340 such as a DVD, and a variety of input/output external devices including a speaker 350, a microphone 360, and so on.

The information processor 100 is provided with a database 110 (denoted by image D/B in the figure) storing the visual information that can be displayed by the display unit 200, such as moving picture information, still images, graphic information, text information, and so on; a database 120 (denoted by comment D/B in the figure) storing the comment information consisting of the visual information of characters, graphics, etc. and auditory information of audio, sound effect, etc.; a control unit 130 for controlling display of the visual information stored in D/B 110 and controlling output of the comment information stored in D/B 120; and a data input/output unit 140 (denoted by I/O in the figure) for enabling transmission and reception of data to and from the input/output external devices 310 to 360.

When the recording/reproducing apparatus is applied to a communication system enabling transmission and reception of data among a plurality of terminal devices through predetermined transmission means, the above information processor 100 may be provided with a data input/output unit (I/O) for enabling transmission of data to and from other terminal devices. In this configuration, any other terminal device connected through the transmission means to the recording/reproducing apparatus can function as a comment input device.

FIGS. 18A and 18B are diagrams showing the logical structures of the data stored in the image D/B 110 and in the comment D/B 120, respectively, in FIG. 17. Particularly, FIG. 18A shows the logical structure of image data 1100 (visual information) stored in the image D/B 110. Each of the image data 1100 is stored as an information section provided with a timestamp indicating a reproduction time thereof, in the image D/B 110. On the other hand, FIG. 18B shows the logical structure of comment data 1200 (comment information) stored in the comment D/B 120. This comment data 1200 is stored in the comment D/B 120 in a state in which individually linked information is added in units of the information sections stored in the image D/B 110. The comment data 1200 is provided with reproduction time zone information designated by a display start time and a display end time, as link information to the image data 1100 stored in the image D/B 110. Namely, an image data group 1100 provided with timestamps included in a reproduction time zone is correlated with comment data provided with the reproduction time zone as link information, whereby it becomes feasible to display a moving picture by continuously reproducing the image data group 1100.

Figure 19:
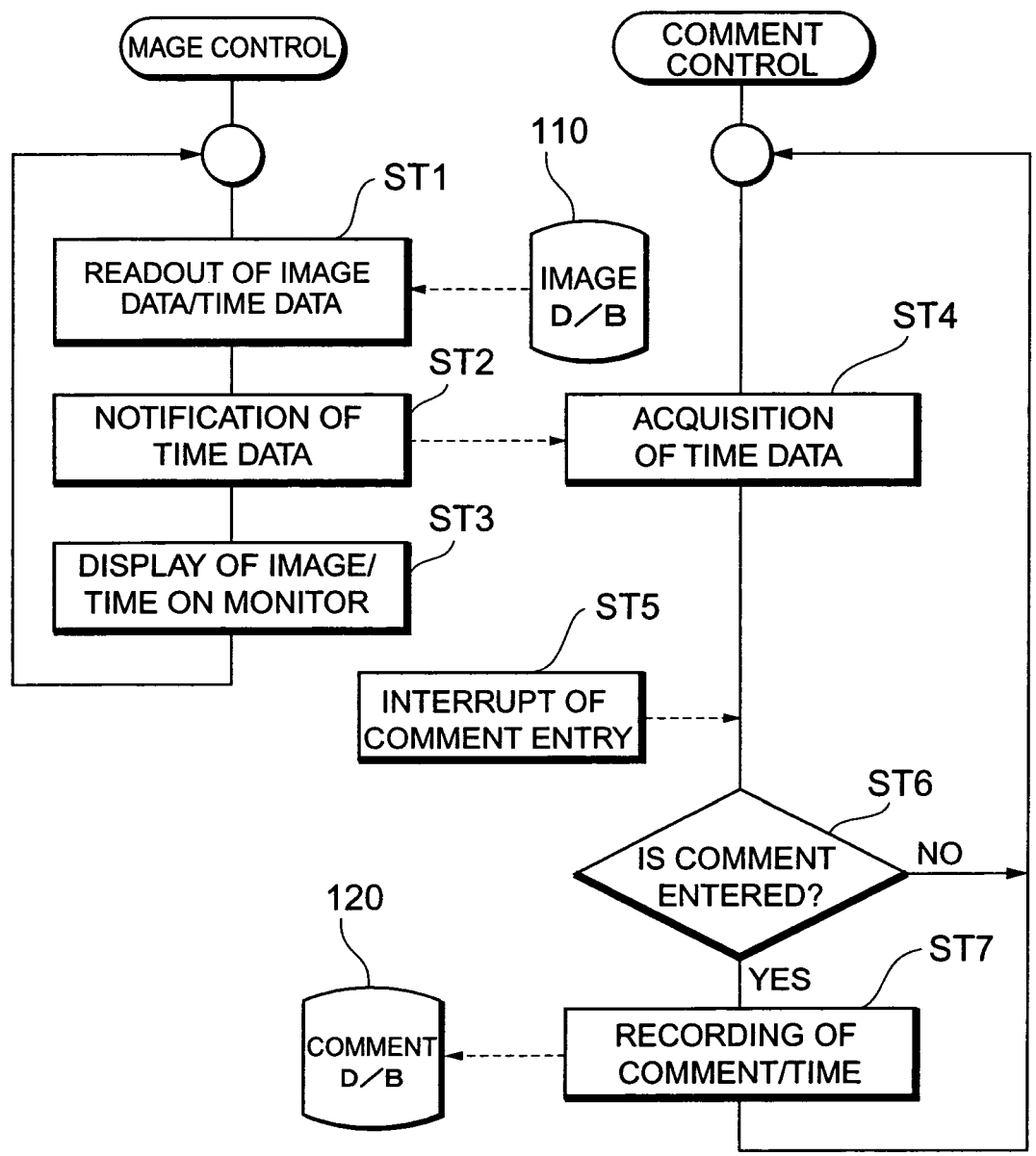
FIG. 19 is a flowchart for explaining the comment information recording operation in the recording/reproducing method of visual information according to the present invention.
Figure 20:
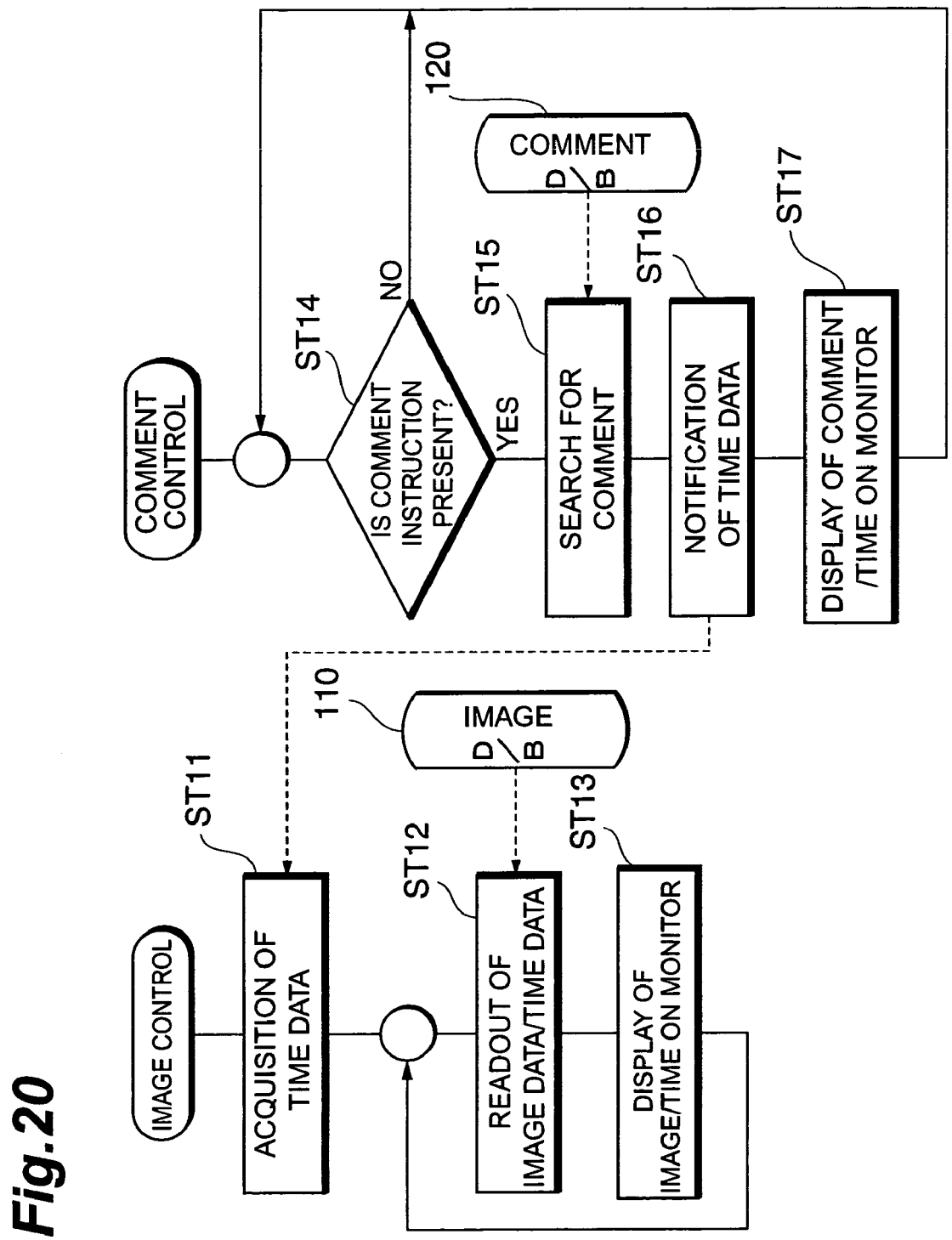
FIG. 20 is a flowchart for explaining the comment information output operation in the recording/reproducing method of visual information according to the present invention.

Individual operations in the recording/reproducing method of visual information according to the present invention will be described below referring to the flowcharts of FIGS. 19 and 20. FIG. 19 is a flowchart for explaining a comment information recording operation in the recording/reproducing method of visual information according to the present invention, and FIG. 20 a flowchart for explaining a comment information output operation in the recording/reproducing method of visual information according to the present invention. Each of the comment information recording operation and the comment information output operation will be described about the case where the visual information is a moving picture stored in the image D/B 110 (each of consecutive image data items is stored as an information section provided with a timestamp (time data) as link information, as shown in FIG. 18A).

In the comment information recording operation, image control for reproducing a window of a moving picture for guidance is carried out in parallel to comment control for adding comment information to a desired scene designated in the moving picture under reproduction.

In the image control, the control unit 130 first sequentially reads image data and time data (timestamps) out of the image D/B 110 with reference to the timestamps (step ST1). Inside the control unit 130, the time data out of the data thus read out is provided to the comment control side (step ST2); the image data is supplied in the readout order to drawing unit 150 and the drawing unit 150 effects window display on the display unit 200, thereby displaying the moving picture (step ST3).

In the comment control, on the other hand, the control unit 130 acquires the time data sequentially provided from the image control side and manages the time (step ST4), and in that state the control unit 130 checks whether there is an entry of comment information (step ST6). When in this comment entry awaiting state a comment entry request (interrupt) is made from the input/output external device such as the keyboard 310, the mouse 330, or the like (step ST5), the control unit 130 accepts comment information through I/O 140 and the reproduction time zone information that specifies image data correlated with the comment information, and sequentially records this reproduction time zone information as link information to the image data along with the comment information into the comment D/B 120 (step ST7). The reproduction time zone information is defined by a display start time and a display end time of the moving picture displayed on the display unit 200, and image data with timestamps included in the range from the display start time to the display end time is information sections of the visual information correlated with the entered comment information.

In the comment information output operation, when a comment information output request is issued, the image control is carried out at the initiative of the comment control.

Namely, when in the comment control the input/output external device notifies the control unit 130 of an output request for comment information through I/O 140 (step ST14), the control unit 130 searches the comment D/B 120 for the designated comment information and link information (the reproduction time zone information consisting of the display start time and the display end time of the moving picture) attached to the comment information (step ST15).

Then the reproduction time zone information (time data) thus read out is provided to the image control side (step ST16); the comment information read out of the comment D/B 120 is fed from the control unit 130 to the drawing unit 150 and the drawing unit 150 displays the comment information on the display unit 200.

On the other hand, when in the image control the time data suggesting an image data group to be reproduced from the comment control side is acquired from the comment control side (step ST11), the control unit sequentially reads the image data with the timestamps suggested by the time data (reproduction time zone information) thus acquired and the corresponding timestamps out of the image D/B 110 (step ST12) and sequentially sends them to the drawing unit 150. The drawing unit 150 sequentially window-displays the image data received from the control unit 130, at predetermined positions on the display unit 200, thereby effecting the window display of the moving picture correlated with the designated comment information (step ST13).

Instruction for a tennis player will be described below as a specific example.

Figure 21A:
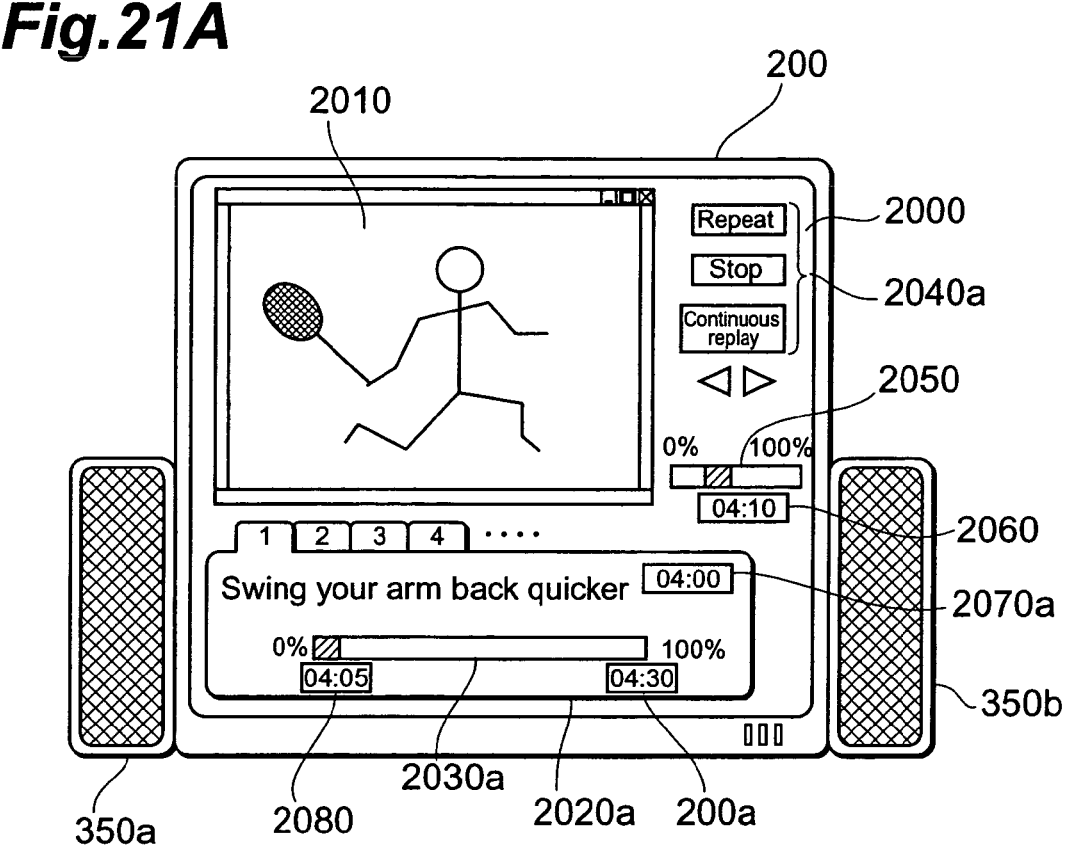
FIGS. 21A and 21B are illustrations for conceptually explaining a first example of the recording/reproducing method of visual information according to the present invention.
Figure 21B:
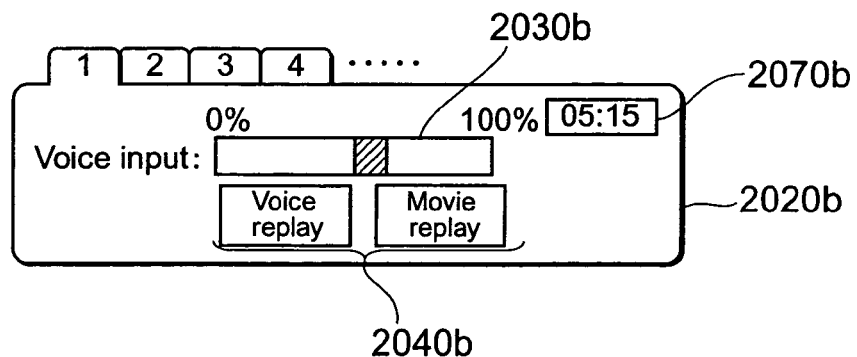

First, the visual information prepared is moving picture data obtained by imaging a tennis player as a subject with an environment sound including ball sound and others by a video camera, and this moving picture data is stored in the image D/B 110 in a state in which the moving picture data is provided with timestamps at intervals of a predetermined time. As the image control, the control unit 130 sequentially reads the stored image data out of the image D/B 110 and feeds it to the drawing unit 150. The drawing unit 150 sequentially reproduces the image data fed from the control unit 130, in a window on the display unit 200, thereby implementing reproduction of the moving picture in the window 2010, as shown in FIG. 21A. FIGS. 21A and 21B are diagrams for conceptually explaining a comment information input operation, as a first example of the recording/reproducing method of visual information according to the present invention.

At this time, a coach enters voice comment information according to need through the input/output external device such as a wireless microphone or the like. When the comment is entered by voice, the control unit 130 acquires a moving picture reproduction time at the time of a start of the comment entry and a moving picture reproduction time at the time of an end of the comment entry, as comment control, and puts the comment information into the comment D/B 120 while correlating the entered comment with an image data group provided with timestamps included in the time zone.

This permits the control unit 130 to manage each comment data stored in the comment D/B 120 and an arbitrary image data group (image section group) stored in the image D/B 110, in a correlated state with each other.

FIG. 21A shows a display state of the monitor screen 2000 in the display unit 200 in reproduction of the moving picture. Displayed on this monitor screen 2000 are the window 2010 to reproduce and display the moving picture, operation buttons 2040a for instructions of image control (a repeat function, a replay function, a continuous replay function, fast-forwarding, and rewind), and video position 2050 and video time 2060 of the moving picture displayed out of the series of moving picture data stored in the image D/B 110. The monitor screen 2000 further displays a comment input/output card 2020a for input/output of a comment as well. The comment input/output card 2020a shown in FIG. 21A is a window capable of input/output of a comment of characters, which indicates at every comment entry, the contents of the comment of characters, a reproduction time 2070*a* of the moving picture in the window 2010, a meter 2030*a* indicating the position of the moving picture under reproduction, and a display start time and a display end time of the corresponding portion of the moving picture correlated with this comment. However, the comment to be entered does not always have to be the character information, but may also be voice as described above. In this case, the comment input/output card displayed on the monitor screen 2000 may be designed as shown in FIG. 21B. Displayed in this voice comment input/output window 2020*b* are a moving picture reproduction time 2070*b*, a meter 2030*b* indicating the position of the video under reproduction, and operation buttons 2040*b* for giving instructions to reproduce the voice comment and the moving picture.

When a short comment is entered in the comment entry operation, it is often the case that a listener cannot comprehend the contents when listening once. It is, therefore, preferable that the video and comment be set repeatable as shown in the monitor screen 2000 of FIG. 21A. In practice, the output of the moving picture is completed about five seconds after completion of the comment entry, and then the tennis player can personally observe the play without a feeling of strangeness and can readily review the video of the player through repeated replays (this repeat function is disabled if the repeat reproduction is unnecessary).

Furthermore, there are many things newly noticed through the reproduction process of the moving picture and, in this case, the visual information of characters, graphics (freehand), etc. as a comment is also effective. The comment of characters, graphics, etc. is also successively entered into the comment input/output card 2020*a*, while stopping the reproduced video during the entry of the comment. Since a moving picture to be linked to one comment input/output card (comment data corresponding to one comment entry) has a definite width (reproduction time zone), it is also determined in combination; whereby, in the case where the moving picture is reproduced separately from typical still images, the reproduction of the moving picture is started from the position corresponding to the comment entry and stopped at the position designated by the link information, based on the link information of the comment input/output card designated. Without any particular instructions, the moving picture from the display start time to the display end time designated by the link information is repeatedly reproduced and displayed in the window 2010 and during this period, the comment input/output card 2020*a* with the characters, graphics, etc. therein is displayed on the monitor screen 2000, whereby the observer (an instructor or a tennis player himself or herself) can continuously be given visual stimulation by the video, characters, and so on. Since these are displayed in the window of the card format on the monitor screen 2000, the user can jump anywhere and browse the information while enjoying excellent operability.

When the comments based on the auditory information by voice and others and the comments based on the visual information are displayed in the order of their entry times in the form of stacked cards (cf. FIG. 21A), the observer can readily check how many comments were given in total, and readily refer to them.

Figure 22:
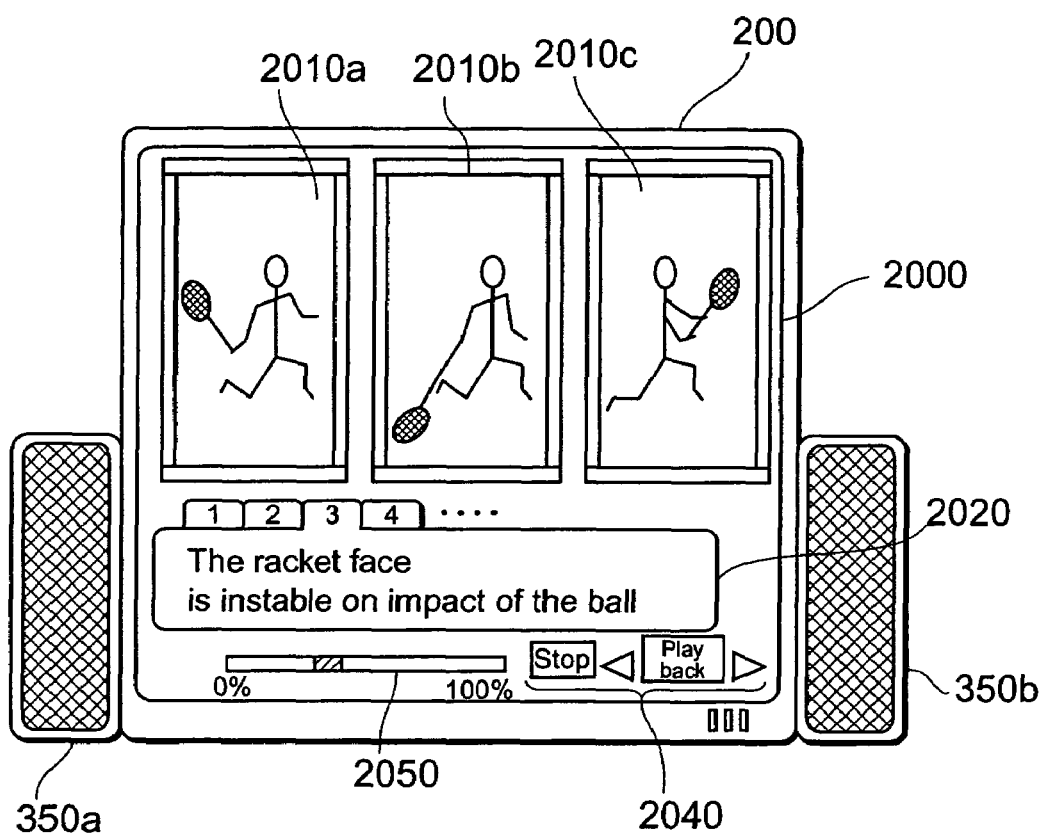
FIG. 22 is an illustration for conceptually explaining a second example of the recording/reproducing method of visual information according to the present invention.

FIG. 22 is a diagram for conceptually explaining a comment information output operation, as a second example of the recording/reproducing method of visual information according to the present invention. In the second example, together with a comment input/output card, typical still images (one or more still images) are displayed in respective windows. Since the comment input/output card and still images are simultaneously displayed in this way, a plurality of persons can take advantage thereof in discussion or commentary, though the screen is not in the moving picture mode.

Specifically, in the second example, as shown in FIG. 22, a plurality of consecutive still image display windows 2010*a*-2010*c* at intervals of a predetermined time are displayed while the comment input/output card 2020 is displayed, on the monitor screen 2000 of the display unit 200. In this comment input/output card 2020, the comment of characters, voice, etc. entered at each video position is displayed, or is outputted from the speakers 350*a*, 350*b*. Further displayed on the monitor screen 2000 as well are a meter 2050 indicating the video position of the moving picture corresponding to the still images shown in the windows 2010*a*-2010*c*, and operation buttons 2040 for selection of still images to be displayed, for a shift of the video time, and so on.

For the commentary and others, the still images to be displayed in the respective windows 2010*a*-2010*c* are preferably controlled to optimal still images displayed with some time shift. For a subject with quick motion as in the case of sports, more preferably, five to six still images are simultaneously displayed. Namely, when the comments and visual information are dynamically linked to each other in confirmation with the moving picture, confirmation with a plurality of still images, etc., it becomes feasible to provide more finely detailed commentary or analysis.

In the voice reproduction and image reproduction making use of the operation buttons displayed in the comment input/output card, it is not known exactly how much volume of data is included per se. If the video position of the moving picture or still images under reproduction is displayed relative to the volume of image data stored in the image D/B 110, there are merits that it becomes easier for the user to grasp the entirety and that the reproduction operation can be finely conducted, for example, by designating the reproduction position, and so on. The comment input/output cards displayed on the monitor screen 2000 are preferably arranged so as to adapt their display modes to use forms and classify them; for example, they are displayed in a stacked state in the order of their entry times (voices and characters can be mixed); they are displayed in a stacked state in the order of their entry times while discriminating voices from characters; they are displayed in a stacked state in the order of their entry times while classifying them by persons entering them, and so no.

In a motion review or self-examination work by the player himself or herself, the comment entry by voice is completed in a mere instant and it is thus preferable to adopt the comment entry by visual information of characters or the like. In that case, a comment entered by voice is preferably converted into characters.

In the recording/reproducing method and apparatus of visual information according to the present invention, as described above, the comment information and visual information is correlated with each information section in either of on-line comment entry (voice or text of characters and others) and off-line comment entry, whereby it is feasible to correlate one or more still images therewith and repeatedly reproduce the moving picture in a predetermined reproduction time zone.

It is relatively easy to sectionalize the cards in the case of comment entry based on visual information of characters, graphics, etc., while, in the case of comment entry by voice, if comments are continuously entered, it is difficult to properly sectionalize the comment input/output cards. In this case, it is possible to employ such software-base segmentation that a breakpoint of a comment is defined, for example, if there is no comment entry by voice for three or more seconds. In the case of a musical rehearsal or the like, when a director enters a comment with a wireless microphone, voices of performers are also simultaneously taken in and it is difficult to distinguish between voices of the director and voices of performers themselves. In this case, the voices of performers are simultaneously recorded on the occasion of recording the visual information and are filtered out during the entry of the comment by the director, so as to remove the voices of the performers from the comment information. This can minimize the level of unnecessary sound upon reproduction of the comment, thereby enhancing recognition of voice entry.

The present invention can be applied to the instruction in dances, musicals, and plays, of course, and can also be commonly applied to coaching in various sports including swimming, track and field, etc., instruction for service at fast food or convenience stores, instruction for presentation, training of teachers, and so on. The above examples described the cases of comment entry making use of the comment input/output card displayed on the monitor screen, but it is also possible to adopt graphic entry with lines, arrows, etc. overlapping the image. Furthermore, the visual information is not limited to the moving picture or a plurality of still images, but it may be text data.

Furthermore, the recording/reproducing method of visual information according to the present invention can also be applied to counseling performed through predetermined transmission means such as a network. FIG. 23 is an illustration for conceptually explaining a third example of the recording/reproducing method of visual information according to the present invention.

Usually, when only characters are given as comment information, warmth or sense of trust is unlikely to be transferred in guidance. Particularly, in the case of counseling as health care intervention, to establish closer relationship between a client and a counselor is important in enhancing the curative effect. In the third example, therefore, non-verbal moving picture information of "nodding" appearance or voice of the counselor as an instructor is taken as comment information against the video of the client, and this non-verbal moving picture is synchronized with the visual information transmitted from the client side, whereby effective information can be provided on the occasion of confirming the comment on the client side.

In the third example, in order for a client to report worries or progress of curing, the client first delivers or distributes video mail containing the video of himself or herself through the transmission means 27 to the counselor. In FIG. 23, 2000a represents a monitor screen displaying a video window of the client (client image) 2010d.

The counselor observes the video delivered (the client image 2010d) and stops the video or reproduces the video from a predetermined video position in order to link comment information thereto at a desired location. Thereafter, non-verbal moving picture 2010e and voice (voice of the counselor such as "yes," "I see," etc. recorded through the microphone 36), such as "a nod" of the counselor reacting to the client image 2010d, is recorded as comment information in a state in which it is synchronized with the predetermined portion of the video. The synchronization between the non-verbal moving picture and the visual information may be achieved where the visual information is a still image or a moving picture of a predetermined reproduction time zone. In FIG. 23, 2000b represents a monitor screen displaying a video window of the counselor (non-verbal moving picture 2010e) taken in through the CCD camera 5 and from the imaging unit 6, and such a moving picture of the counselor is obtained by the two-way interactive system for implementing distance interlocution in the eye-contact state, for example, as described in U.S. Pat. No. 6,137,526 and No. 6,005,604. During the input operation of such comment information, the counselor can also enter character information by use of the input/output external device such as the keyboard 310 or the like (while stopping the video during this period).

In FIG. 23, 2000c represents a monitor screen simultaneously displaying the non-verbal moving picture 2010e of the counselor linked at the predetermined video position of the video (client image 2010d) being the visual information from the client delivered through the transmission means 27, the client image 2010d, and a comment board 2020 displaying the comment (characters) entered by the counselor through the keyboard 310, as described above. When the information (which may contain character information as comment information) edited in the state in which the counselor video 2010e reacting to the video 2010d of the client is synchronized with the client video in this way is returned from the counselor to the client through the transmission means 27, the client views it and understands the reaction of the counselor during confirmation of the comment, whereby the sense of trust between them is also enhanced in the counseling between remote places.

In the case of the counseling between remote places, as described above, if the motion and voice of "a nod" or the like of the counselor viewing the visual information is linked as comment information in the synchronized state with the visual information, to the visual information such as the video mail or the like from the client, the client counseled by the counselor can check the reaction of the counselor simultaneously with his or her own image picked up for counseling, whereby closer relationship can be established even between remote places.

Cases of attaching the non-verbal moving picture of the instructor as comment information are not limited only to such counseling as in the third example. For example, in the fields of show business and sports, if players or actors are allowed to check the reaction of the instructor (coach) viewing the video with a nod, they can acquire instructor's evaluation from a non-verbal aspect, which is considered better.

Another example is instruction for brushing of teeth given by a dentist. Brushing of teeth is very important as an example of preventive treatment, but it is hard to practice satisfactorily or to continue. If the recording/reproducing method of visual information is applied to such cases, a patient can periodically deliver video mail and request the dentist to check it, whereby the effect of maintaining or raising motivation can be expected. The dentist observes the patient's brushing video (delivered or distributed through a network or the like) and gives an okay sign with nodding, or the dentist once stops the video at a problematic scene and writes points to be improved, into a comment card while speaking to the patient, or gives instruction by voice. When the patient desires to check trouble points in particular, the patient can specify a desired comment card (which can be done by mouse operation on the monitor screen), so as to efficiently check only points to be improved.

In the above instruction the dentist links the comment information to the visual information provided by the patient, but the patient and dentist may repeatedly link comment information; for example, the patient links comment information to the comment information linked by the dentist. The repetition of the comment information entry works can also be adopted in each of the above embodiments.

Further, as another application of the recording/reproducing method of visual information according to the present invention is, for example, the producing of self-introduction that is used at temporary-employment agencies, or the like.

In this case, a job seeker registered in the temporary-employment agency produces a P.R. media for self-introduction. In general, the media, in which air (aspect and behavior) such that the seeker oneself is speaking about one's concrete ability, and the like is stored, is produced by one's moving picture and voice.

However, there are cases that the above-mentioned media, in which the behavior and aspect of the seeker are merely stored with one's voice, can not sufficiently inform of the point that the seeker wants to lay emphasis to an observer, and that the observer wants to preferentially confirm a specific information regarding to each of a plurality of seekers. For this reason, in the recording/reproducing method of visual information, the caption and/or comment card, corresponding to the point to be laid emphasis, are displayed on the monitor screen as searching keys while having links to the moving picture containing the one's voice.

As described above, the concrete display of the comment card, and the like onto the screen may text data or a figure. For example, when the comment card regarding to the theme of story such as one's career, license, hobby, and the like which the person image (image of the seeker himself) displayed on the screen speaks about, is displayed in a predetermined display area on the screen, and when the contents, as text data, regarding to first-class data processing specialist, specialist in social insurance, or the like are displayed in another display area on the screen, more concrete P.R. can be done. The display timing of the comment card or text card displayed together with the moving picture, size, display position, and the like are also edited so as to have links to the moving picture and voice. Accordingly, since the caption or comment card itself can become a searching key for the observer, the necessary moving picture and voice can selectively displayed by the observer clicking a display point (such as record, license, hobby) on the screen which the observer has an interest. For example, when the observer clicks on the term of license, the observer can selectively observe the scene only corresponding to the clicked term, and thereby the observer can effectively observe mass-information.

The self-introduction media or presentation media as described above has a condition such that the one's presentation has to be fleshly picked up. For this reason, it is necessary the image pickup of the seeker in a virtual space (while achieving eye contact between the observer and the image of the seeker displayed on the screen) in which the seeker naturally talks to the observer.

Thus, in this embodiment, in a similar fashion of the above embodiment, when the two-way interactive system (U.S. Pat. No. 6,137,526) realizing an indirect eye-contact state is applied, the eye-contact between the image of the seeker and the observer can be achieved as a result by the seeker talking to the observer at the time of producing media, and thereby a media of natural presentation can be obtained. When comment information, which can become a searching key of the comment card, and the like, is attached to thus obtained media, more effective media can be obtained.

In the recording/reproducing method and others of visual information according to the present invention, as described above, the visual information that can be displayed in a window on the monitor screen is stored in the segmented state in a plurality of information sections in the database, and one or more information sections out of the information sections and the comment information individually linked thereto are stored in the database; therefore, using comment information as a search key, information sections in the visual information linked to the selected comment information can readily be reproduced and displayed on the monitor screen, based on the link information attached to the comment information. This presents the effect of enabling useful personal learning with effective use of the comment information given by the instructor even in the environment without direct appearance of the instructor or the like, in the fields where the instruction using the visual information is effective.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A video editing system comprising:

image pickup means for individually picking up videos of respective, first and second interlocutors indirectly or directly facing each other through predetermined transmission means;

first editing means obtaining visual information to be displayed on a monitor screen by combining at least the videos of the first interlocutor and the second interlocutor each retrieved from said image pickup means in a state in which display timings of the respective videos are substantially synchronized with each other;

second editing means for combining the visual information obtained by said first editing means, with one or more multimedia data newly entered, in a state in which a display timing of the multimedia data is substantially synchronized with the display timings of the videos of the first and second interlocutors, thereby obtaining new visual information; and a recording/reproducing apparatus of the visual information, said apparatus including:

a display unit having the monitor screen and displaying visual information in a window on the monitor screen thereof;

a database storing the visual inform in a state in which the visual information is segmented in a plurality of information sections and for storing comment information individually linked to one or more information sections out of the information, sections; and a control unit for controlling reproduction and display of data constituting a desired information section among the visual information stored in said database, wherein, using a comment information item selected from the comment information, as a search key, said control unit specifies link information attached to the comment information item selected, reads an associated information section in the visual information on the basis of the link information specified, and lets said display unit display both the selected comment information item and the information section thus read.

2. A video editing system according to claim 1, wherein the first and second interlocutors indirectly or directly face each other in an eye-contact state with each other.

3. A video editing system according to claim 1, wherein said first editing means combines the visual information thus obtained, with one or more multimedia data newly entered, in a state in which a display timing of the multimedia data is substantially synchronized with the display timings of the videos of the first and second interlocutors, thereby obtaining new visual information.

4. A video editing system according to claim 1, wherein said second editing means repeatedly combines the visual information obtained by said first editing means, with multimedia data entered, in a state in which a display timing of the multimedia data is substantially synchronized with the display timings of the videos of the first and second interlocutors, thereby obtaining new visual information of nested structure.

5. A video editing system according to claim 1, further comprising:
   display means for displaying the visual information obtained by said first editing means, on a predetermined display device.

6. A video editing system according to claim 1, further comprising:
   display means for displaying the visual information obtained by at least one of said first and second editing means, on a predetermined display device.

7. A video editing method comprising:
   a pickup step of individually picking up at least videos of respective, first and second interlocutors indirectly or directly facing each other through predetermined transmission means;
   a first editing step of obtaining visual information by combining the videos of the first and second interlocutors thus picked up are combined in a state in which display timings of the respective video are substantially synchronized with each other;
   a second editing step of combining the visual information obtained by said first means, with one or more multimedia data newly entered, in a state in which a display timing of the multimedia data is substantially synchronized with the display timings of the videos of the first and second interlocutors, thereby obtaining new visual information; and
   a recording/reproducing step of recording/reproducing the visual information, said recording/reproducing step comprising:
      a storage step of storing visual information that can be displayed in a window on a monitor screen, in a state in which the visual information is segmented in a plurality of information sections and storing comment information individually linked to one or more information sections out of the information sections;
      a reading step of, using a comment information item selected from the comment information, as a search key, specifying link information attached to the selected comment information item and reading an associated information section in the visual information on the basis of the link information specified; and
      a reproduction-display step of reproducing and displaying both the selected comment information item and the information section thus read, on the monitor screen.

8. A computer program stored in a computer readable medium for letting a computer execute a method according to claim 7.

9. A recording medium in which a computer program for letting a computer execute a method according to claim 7 is recorded.

10. A method according to claim 7, wherein said visual information contains a moving picture comprised of a plurality of consecutive images corresponding to the respective information sections and provided with respective timestamps,
   said recording/reproducing step further comprising:
      a third editing step of correlating each of said comment information with one or more information sections forming the moving picture, using link information of a time range indicating a predetermined reproduction time zone of the moving picture.

11. A method according to claim 7, wherein said visual information contains one or more still images corresponding to the respective information sections,
   said recording/reproducing step further comprising:
      a fourth editing step of correlating each of the comment information with one or more still images displayed on the monitor screen.

12. A method according to claim 11, wherein said visual information contains one or more still images being images consecutive at predetermined intervals out of images constituting a moving picture and corresponding to the respective information sections, and
   wherein said fourth editing step is to adjust a time range indicating a predetermined reproduction time zone in the moving picture and thereby select or adjust one or more still images to be displayed on the monitor screen.

13. A method according to claim 7, wherein said visual information contains a moving picture comprised of a plurality of consecutive images corresponding to the respective information sections and provided with respective timestamps, and
   wherein said reproduction-display step is to continuously reproduce and display on the monitor screen, an image group provided with timestamps included in a reproduction time zone designated by the link information to the comment information item selected.

14. A method according to claim 7, wherein said visual information contains one or more still images being images consecutive at predetermined intervals out of images constituting a moving picture and corresponding to the respective information sections, and
   wherein said reproduction-display step is to reproduce and display on the monitor screen, a still image specified by the link information to the comment information item selected and at least one of still images before and after a reproduction time of the still image specified.

15. A method according to claim 7, wherein said comment information contains at least one of auditory information and visual information.

16. A method according to claim 7, wherein said comment information contains a non-verbal moving picture picked up from an observer observing the visual information under reproduction, and the non-verbal moving picture and the visual information each are stored in a state in which they are synchronized with each other.

17. A method according to claim 16, wherein said comment information further contains auditory information synchronized with the non-verbal moving picture and generated by the observer.

18. A method according to claim 7, wherein said visual information includes image information delivered through predetermined transmission means.

19. A method according to claim 7, wherein said visual information includes a person image which is picked up so as to achieve an eye-contact state together with an observer positioned in front of said monitor screen, at the time of displaying said person image on said monitor screen.

20. A system according to claim 1, wherein said visual information contains a moving picture comprised of a plurality of consecutive images corresponding to the respective information sections and provided with respective timestamps, and
wherein said control unit stores the comment information in said database in a state in which each of the comment information is correlated with one or more information sections forming the moving picture, using link information of a time range indicating a predetermined reproduction time zone of the moving picture.

21. A system according to claim 1, wherein said visual information contains one or more still images corresponding to the respective information sections, and
wherein said control unit stores the comment information in said database in a state in which each of the comment information is correlated with one or more still images displayed on said display unit.

22. A system according to claim 21, wherein said visual information contains one or more still images being images consecutive at predetermined intervals out of images constituting a moving picture and corresponding to the respective information sections, and
wherein said control unit is configured to adjust a time range indicating a predetermined reproduction time zone in the moving picture and thereby select or adjust one or more still images to be displayed on said display unit.

23. A system according to claim 1, wherein said visual information contains a moving picture comprised of a plurality of consecutive images corresponding to the respective information sections and provided with respective timestamps, and
wherein said control unit is configured to let said display unit continuously reproduce and display an image group provided with timestamps included in a reproduction time zone designated by the link information to the comment information item selected.

24. A system according to claim 1, wherein said visual information contains one or more still images being images consecutive at predetermined intervals out of images constituting a moving picture and corresponding to the respective information sections, and
wherein said control unit is configured to let said display unit reproduce and display a still image specified by the link information to the comment information item selected and at least one of still images before and after a reproduction time of the still image specified.

25. A system according to claim 1, wherein said comment information contains at least one of auditory information and visual information.

26. A system according to claim 1, wherein said comment information contains a non-verbal moving picture picked up from an observer observing the visual information under reproduction, and the non-verbal moving picture and the visual information each are stored in said database in a state in which they are synchronized with each other.

27. A system according to claim 26, wherein said comment information further contains auditory information synchronized with the non-verbal moving picture and generated by the observer.

28. A communication system comprising predetermined transmission means, and a plurality of terminal devices configured to perform transmission and reception of data through said transmission means, wherein at least one of said plurality of terminal devices has the same structure as a system according to claim 1.

29. A system according to claim 1, wherein said visual information includes a person image which is picked up so as to achieve an eye-contact state together with an observer positioned in front of said monitor screen, at the time of displaying said person image on said monitor screen.

30. A communication system enabling transmission and reception of data among a plurality of terminal devices through predetermined transmission means,
wherein at least one of said plurality of terminal devices has the same structure as a system according to claim 1.

31. A computer program stored in a computer readable medium for letting a computer execute a method according to claim 7.

32. A recording medium in which a computer program for letting a computer execute a method according to claim 7 is recorded.

* * * * *